United States Patent
Koyama

(10) Patent No.: US 10,587,142 B2
(45) Date of Patent: Mar. 10, 2020

(54) CHARGE CONTROL DEVICE

(71) Applicant: DENSO TEN Limited, Kobe-shi, Hyogo (JP)

(72) Inventor: Kiyoshi Koyama, Kobe (JP)

(73) Assignee: DENSO TEN Limited, Kobe (JP)

( * ) Notice: Subject to any disclaimer, the term of this patent is extended or adjusted under 35 U.S.C. 154(b) by 71 days.

(21) Appl. No.: 15/918,302

(22) Filed: Mar. 12, 2018

(65) Prior Publication Data

US 2018/0351384 A1    Dec. 6, 2018

(30) Foreign Application Priority Data

May 31, 2017   (JP) ................................ 2017-108216

(51) Int. Cl.
| | | |
|---|---|---|
| *H02J 7/00* | (2006.01) | |
| *H02J 7/34* | (2006.01) | |
| *H02M 3/158* | (2006.01) | |
| *H02J 9/06* | (2006.01) | |
| *H02J 9/04* | (2006.01) | |
| *H02M 1/32* | (2007.01) | |
| *H02M 1/00* | (2006.01) | |

(52) U.S. Cl.
CPC .......... *H02J 7/0072* (2013.01); *H02J 7/0054* (2013.01); *H02J 7/345* (2013.01); *H02J 9/061* (2013.01); *H02M 3/158* (2013.01); *H02J 9/04* (2013.01); *H02M 2001/0003* (2013.01); *H02M 2001/0029* (2013.01); *H02M 2001/0096* (2013.01)

(58) Field of Classification Search
CPC ........ H02J 7/0072; H02J 7/0054; H02J 9/061; H02J 7/345; H02M 3/158; H02M 2001/0096; H02M 2001/0003
USPC ......................................................... 320/167
See application file for complete search history.

(56) References Cited

U.S. PATENT DOCUMENTS

| | | | | | |
|---|---|---|---|---|---|
| 4,178,594 | A * | 12/1979 | Senger | .................... | G01S 13/68 342/75 |
| 7,119,525 | B1 * | 10/2006 | Yoshino | ................ | H02M 3/157 323/283 |
| 7,453,250 | B2 * | 11/2008 | Qiu | ..................... | H02M 3/1584 323/282 |
| 7,764,054 | B1 * | 7/2010 | Guo | .................... | H02M 3/1584 323/224 |
| 7,868,603 | B2 * | 1/2011 | Lacombe | .............. | H02M 3/156 323/285 |
| 8,164,315 | B2 * | 4/2012 | Yamamoto | ............ | H02M 3/156 323/268 |

(Continued)

FOREIGN PATENT DOCUMENTS

| | | |
|---|---|---|
| JP | 2007-221933 A | 8/2007 |
| JP | 2009-303281 A | 12/2009 |

(Continued)

*Primary Examiner* — M Baye Diao
(74) *Attorney, Agent, or Firm* — Oliff PLC

(57) ABSTRACT

A charge control device includes a switching regulator that charges a capacitor with electricity supplied from a power supply. The charge control device is characterized in that feedback unit that feedback-inputs a predetermined control amount to the switching regulator is provided, and the switching regulator includes a control unit that controls a charge current supplied to the capacitor in accordance with the control amount feedback-input from the feedback unit.

5 Claims, 14 Drawing Sheets

(56) References Cited

U.S. PATENT DOCUMENTS

| | | | | |
|---|---|---|---|---|
| 8,358,082 B2* | 1/2013 | Henry | ................ | H05B 41/2828 |
| | | | | 315/209 R |
| 8,564,272 B2* | 10/2013 | Yen | ........................ | H02M 1/32 |
| | | | | 323/288 |
| 8,779,727 B2* | 7/2014 | Akaho | ..................... | H02J 7/045 |
| | | | | 320/141 |
| 9,992,828 B2* | 6/2018 | Battaglia | ............ | H05B 33/0815 |
| 2005/0088856 A1* | 4/2005 | Yamamoto | .......... | H02M 3/1588 |
| | | | | 363/19 |
| 2007/0200540 A1* | 8/2007 | Hashimoto | ............. | H02M 1/32 |
| | | | | 323/282 |
| 2015/0077082 A1* | 3/2015 | Kilic | ....................... | H02M 1/32 |
| | | | | 323/284 |
| 2015/0381046 A1* | 12/2015 | Chang | ................... | H02M 3/156 |
| | | | | 323/271 |

FOREIGN PATENT DOCUMENTS

| | | |
|---|---|---|
| JP | 2016-046993 A | 4/2016 |
| JP | 2016-054628 A | 4/2016 |

* cited by examiner

CHARGE CONTROL DEVICE

CROSS-REFERENCE TO RELATED APPLICATION

The present application claims priority to Japanese Patent Application No. 2017-108216, filed May 31, 2017, the entire contents of which are incorporated herein by reference.

FIELD

The present invention relates to a charge control device.

BACKGROUND

Conventionally, a drive recorder for photographing a situation around a vehicle or inside the vehicle by an image pickup apparatus such as a camera or the like mounted on the vehicle and for recording photographed images is known. Through the drive recorder, the situation around the vehicle or inside the vehicle can be recorded as images when a predetermined phenomenon such as an impact or the like has occurred, for example. The drive recorder includes a power supply for backup in some cases so that, even if disconnection with a battery that supplies power is caused by the impact which has occurred, for example, a predetermined operation can be performed.

Examples of the power supply for backup included in the drive recorder include an electric double-layer capacitor (hereinafter referred to also as an "EDLC") also called an Ultracapacitor or a Supercapacitor, for example. Since the EDLC can relatively improve a power storage amount of electric energy, saving/storing of the recorded images in a removable memory (an SD card, for example) or image photographing and recording/storing after occurrence of the impact are made possible.

With the recent improvement in functions and performances of the drive recorder, a drive recorder including the EDLC as a power supply for backup has spread. Prior-art documents describing an art relating to the art explained in the Description include one following patent documents.

[Patent Document 1] Japanese Patent Laid-open No. 2016-46993

[Patent Document 2] Japanese Patent Laid-open No. 2016-54628

SUMMARY

In an electronic equipment such as a drive recorder or the like including an EDLC as a power supply for backup, the electricity (electric charge) charged during an operation needs to be discharged to an empty state at transition to a non-operation state in order to suppress deterioration of the EDLC. Thus, at start of the operation, the EDLC needs to be quickly charged from the empty state to the electricity amount capable of backup for the operation of the electronic equipment by using the electricity supplied from a battery.

In a charge circuit by a linear regulation type, a heat generation amount is high and a circuit loss is large and thus, it is difficult to handle the quick charge period to the EDLC. In a charge circuit by a switching type, a function of supplying a constant current for charging the EDLC is needed. However, in the switching type, an exclusive constant current control function for suppressing low-harmonic oscillation at time division of the electricity supplied from the battery or the like by switching on/off is provided and then, the EDLC needs to be charged quickly while the electricity supplied from the battery or the like is kept at a constant value or less. Since an IC including a switching-type charge circuit as above is not provided as a general-purpose type, a dedicated IC development has been in demand.

An object of the present invention is to provide an art of constant current control capable of rapid charge of a capacitor.

An aspect of a disclosed art is exemplified by a charge control device. That is, the charge control device includes a switching regulator for charging a capacitor with electricity supplied from a power supply. The charge control device is characterized by including feedback unit that feedback-inputs a predetermined control amount into the switching regulator, and control unit included in the switching regulator, the control unit controlling a charge current supplied to the capacitor in accordance with the control amount feedback-input from the feedback unit.

According to the one aspect of the disclosed art, the art of constant current control capable of quick charge to the capacitor is provided.

DESCRIPTION OF EMBODIMENTS

A charge control device according to an embodiment will be described below by referring to the attached drawings.

Configurations of the embodiments below are exemplifications, and the charge control device is not limited to the configurations of the embodiments.

EMBODIMENTS

Embodiment 1

Block Configuration

Figure 1:
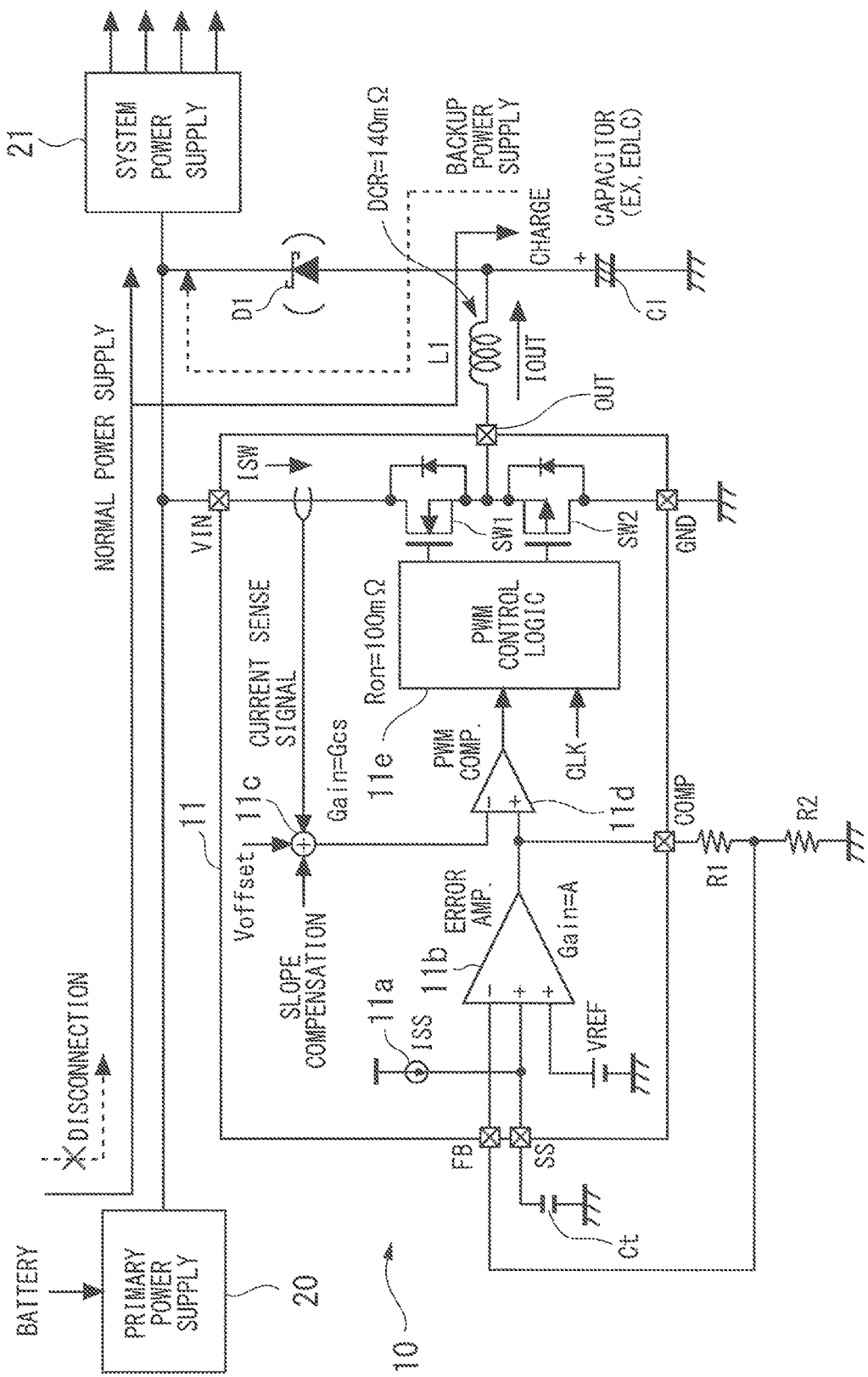
FIG. 1 is a diagram showing an example of a block configuration of a charge control device in an embodiment 1.

FIG. 1 is a diagram showing an example of a block configuration of a charge control device 10 according to the embodiment. The charge control device 10 exemplified in FIG. 1 is a charge control device included in a power receiving unit of an onboard apparatus that can be mounted on a vehicle such as a drive recorder, for example. The onboard apparatus is connected to a battery mounted on the vehicle through the power receiving unit. The power receiving unit converts electricity supplied from the connected battery to a predetermined DC voltage and supplies it to a device such as a memory, a processor and the like provided in the onboard apparatus. Moreover, the power receiving unit includes a power supply for backup. The processor or the like in the onboard apparatus uses the electricity supplied through the power receiving unit and executes various programs stored in the memory or the like. By executing the various programs, a situation around the vehicle or inside the vehicle is photographed by an image pickup apparatus such as a camera or the like mounted on the vehicle, and the photographed images are recorded.

As an onboard apparatus ether than the drive recorder, an audio visual navigation integrated machine (AVN machine) providing various functions including a navigation function, an audio function, an image reproduction function, and a communication function, for example, to an occupant is exemplified. In the following explanation, an onboard apparatus example including the charge control device 10 in the power receiving unit is assumed to be a drive recorder.

In FIG. 1, a capacitor C1 and a diode element D1 constitute a power supply for backup provided in the power receiving unit of the onboard apparatus. An electricity supply form of the power receiving unit shown in FIG. 1 is an example of a form including a "Primary Power Supply 20" for converting supply electricity supplied from a battery to a predetermined DC voltage and a "System Power Supply 21" for converting the DC voltage converted by the "Primary Power Supply 20" to that for each device in the onboard apparatus. In the following the "Primary Power Supply 20" is also called a "first power supply 20", and the "System Power Supply 21" is also called a "secondary power supply 21".

The capacitor C1 constituting the power supply for backup is a capacitor such as EDLC or the like, for example, and the diode element D1 is a Schottky barrier diode or the like. The capacitor C1 has polarity, and a negative electrode side is grounded to GND of the vehicle on which it is mounted, while a positive electrode side is connected to an anode of the diode element D1. A cathode of the diode element D1 is connected to an input end of the secondary power supply 21. To the input end of the secondary power supply 21, the predetermined DC voltage converted by the primary power supply is applied. In the power supply for backup shown in FIG. 1, in the case of disconnection between the battery and the primary power supply 20 or in the case of disconnection between the primary power supply 20 and the secondary power supply 21, for example, the electricity charged in the capacitor C1 is supplied as the electricity with a constant voltage to the secondary power supply 21 through the diode element D1.

(Charge Control Operation)

The charge control device 10 according to the embodiment includes at least a switching regulator 11, an inductor element L1, resistances R1 and R2. The switching regulator 11 is a switching regulator of a general-purpose current mode type. The switching regulator 11 has terminals "VIN", "GND", "OUT", "FB", "SS", and "COMP".

The VIN terminal of the switching regulator 11 is connected to an output end of the primary power supply 20, and the GND terminal is grounded to the GND of the vehicle. Moreover, the OUT terminal of the switching regulator 11 is connected to the other end of the inductor element L1 with one end connected to the anode of the capacitor C1 constituting the power supply for backup.

In the switching regulator 11, the supply electricity of the primary power supply 20 input into the VIN terminal is subjected to time division of a PWM (Pulse Width Modulation) method, and the time-divided electricity is output to the OUT terminal. The electricity output to the OUT terminal charges the capacitor C1 through the inductor element L1.

The switching regulator 11 of the current mode type includes an internal current source 11a, an error amplifier (Error Amp) 11b, a slope compensation unit 11c, a comparator (PWM Comp) 11d, a PWM control unit (PWM Control Logic) 11e, and switching elements SW1 and SW2 as an internal configuration.

The switching elements SW1 and SW2 are semiconductor devices such as a MOSFET (Metal-Oxide-Semiconductor Field-Effect-Transistor) or the like, for example. In FIG. 1, the switching element SW1 is constituted by a P-type MOSFET, the switching element SW2 is constituted by an N-type MOSFET. A source of the switching element SW1 is connected to the VIN terminal, and a drain is connected to a drain of the switching element SW2. A source of the switching element SW2 is connected to a GND terminal. A gate of each of the switching elements SW1 and SW2 is connected to the PWM control unit 11e.

The PWM control unit 11e generates a gate control signal determining an ON state and an OFF state of the switching elements SW1 and SW2 on the basis of an output value of the comparator 11d connected to itself and an input clock signal (CLK) of a predetermined cycle. Here, the ON state is a state indicating a logical value H (5 V, for example) which is a voltage value exceeding a gate threshold value voltage of each switching element, and the OFF state is a state indicating a logical value L (0 V, for example) which is a voltage value smaller than the gate threshold value voltage of each switching element. The switching elements SW1 and SW2 electrically connect the source and the drain when the gate control signal is in the ON state and disconnect the source and the drain in the OFF state.

The switching regulator 11 controls switching operations of the switching elements SW1 and SW2 by controlling a period of the ON state (hereinafter referred to also as an "ON period") of the gate control signal and a period of the OFF state (hereinafter referred to also as an "OFF period") through the PWM control unit 11e.

In the switching regulator 11 of the current mode type, the ON/OFF state, ON period, and OFF period of the gate control signal are determined through the error amplifier 11b, the slope compensation unit 11c, and the comparator 11d.

The slope compensation unit 11c detects a peak value of a current ISW flowing between the VIN terminal and the source of the switching element SW1 during the switching operations of the switching elements SW1 and SW2. Then, the slope compensation unit 11c converts the current ISW detected by using conductance (gain value (Gcs)) set in advance to a voltage signal.

The slope compensation unit 11c generates a slope waveform which becomes a standard of the PWM control in a current mode on the basis of the voltage signal converted from the current ISW and an offset voltage (Voffset). In the generated slope waveform, a slope compensation signal (Slope Compensation) is reflected. The slope compensation unit 11c suppresses low-harmonic oscillation by a phase difference in a voltage change and a current change during the switching operation by reflecting the slope compensation signal (a ramp wave, for example) in the slope waveform generated on the basis of the voltage signal converted from the current ISW and the offset voltage (Voffset).

The slope compensation unit 11c outputs the slope waveform in which the slope compensation signal is reflected to an inverted terminal of the comparator 11d. An error signal output from the output terminal of the error amplifier 11b is input into a non-inverted input terminal of the comparator 11d.

The comparator 11d compares a voltage value of the slope waveform input into the inverted terminal and a voltage value of the error signal input into the non-inverted terminal and outputs a comparison result to the output terminal. If the voltage value of the slope waveform input into the non-inverted input terminal is higher than the voltage value of the error signal input into the inverted terminal, for example, a status signal of the logical value H is output. On the other hand, if the voltage value of the slope waveform input into the non-inverted input terminal is lower than the voltage value of the error signal input into the inverted terminal, a status signal of the logical value L is output.

In the PWM control unit 11e connected to the output terminal of the comparator 11d, a gate control signal that controls the switching operations of the switching elements SW1 and SW2 is generated on the basis of the state of the logical value of the status signal and the periods during which the respective logical values continue.

The error amplifier 11b is an error amplifier including an inverted input terminal and two non-inverted input terminals. The inverted input terminal of the error amplifier 11b is connected to the FB terminal which is a negative feedback input terminal in the switching regulator 11. In the switching regulator 11, a reference voltage VREF is connected to one of the non-inverted input terminals of the error amplifier 11b, while the SS terminal is connected to the other non-inverted input terminal.

The internal current source 11a connected to the S3 terminal (soft start terminal) is a power supply for causing a soft start function in the switching regulator 11 to function. A soft start period is determined in accordance with a capacity of a capacitor Ct connected to the SS terminal outside the switching regulator 11 and a current amount supplied from the internal current source 11a. The output terminal of the error amplifier 11b is connected to the non-inverted input terminal and the COMP terminal of the comparator 11d.

In the switching regulator 11 according to the embodiment, the output voltage of the error amplifier 11b is divided through the resistances R1 and R2 connected to the COMP terminals outside the switching regulator 11, and the divided output voltage is feedback-input into the FB terminal as a bias voltage. The resistances R1 and R2 constitute voltage dividing resistances. One end of the voltage dividing resistance R1 is connected to the COMP terminal, while the other end is connected to the FB terminal. The other end of the voltage dividing resistance R1 connected to the FB terminal is connected to the other end of the voltage dividing resistance R2 with one end grounded to the GND of the vehicle.

In the switching regulator 11 according to the embodiment, an output voltage (Vcomp) of the error amplifier 11b divided by the voltage dividing resistances (R1, R2) through the FB terminal is input as the feedback voltage into the inverted input terminal of the error amplifier 11b.

The error amplifier 11b amplifies a differential voltage (error) between the feedback voltage input into the FB terminal and the reference voltage VREF by a predetermined gain (A) and outputs the amplified differential voltage as an error signal to the output terminal. The output voltage (Vcomp) of the error amplifier 11b is output to the COMP terminal of the switching regulator 11.

Here, a voltage relationship between the output voltage (Vcomp) output to the COMP terminal and the reference voltage VREF is expressed by the formula (1) shown below:

$$Vcomp = \frac{R1 + R2}{R2} \times VREF \qquad \text{Formula (1)}$$

(calculated as $A = \infty$)

As indicated in the formula (1), by setting a value of the voltage dividing resistance (R1, R2) connected to the COMP terminal in advance in accordance with the predetermined gain (A) of the error amplifier 11b and the reference voltage VREF, for example, an arbitrary voltage according to the voltage dividing resistance (R1, R2) value can be output to the output terminal of the error amplifier 11b.

As described above, in the switching regulator 11, the gate control signal is generated by a comparison result between the voltage value of the slope waveform input into the inverted terminal of the comparator 11d and the output voltage value of the error amplifier 11b input into the non-inverted terminal. Thus, in the charge control device 10 according to the embodiment, the current ISW flowing between the source and the drain electrically conducted in the ON period of the switching element SW1 can be controlled by controlling the output voltage (Vcomp) of the error amplifier 11b of the switching regulator 11, for example.

Here, a relationship between the current ISW and the output voltage (Vcomp) of the error amplifier 11b is expressed by the following formula (2):

$$ISW(\text{peak}) = Gcs \times (Vcomp - Voffset) \qquad \text{Formula (2)}$$

※ISW (peak)=Peak value of the ripple current in ISW

As shown in the formula (2), the charge control device 10 according to the embodiment can control the value of the current ISW flowing in between the source and the drain during the ON period of the switching element SW1 of the switching regulator 11 to a constant current value according to the reference voltage VREF and the voltage dividing resistance (R1, R2) values. The switching regulator 11 of the charge control device 10 can supply the current ISW according to accuracy of the reference voltage VREF to the capacitor C1. According to the charge control device 10 according to the embodiment, charging can be performed while the charge current supplied to the capacitor is controlled to a constant value by using the general-purpose switching regulator with a large communication amount.

Moreover, an additional circuit added to the switching regulator 11 is constituted by voltage dividing resistance (R1, R2) dividing the output voltage (Vcomp) of the error amplifier 11b output from the COMP terminal. Thus, size reduction and cost reduction are made possible in the onboard apparatus such as a drive recorder or the like including the charge control device 10 according to the embodiment.

(Charge Current Characteristics)

Figure 2:
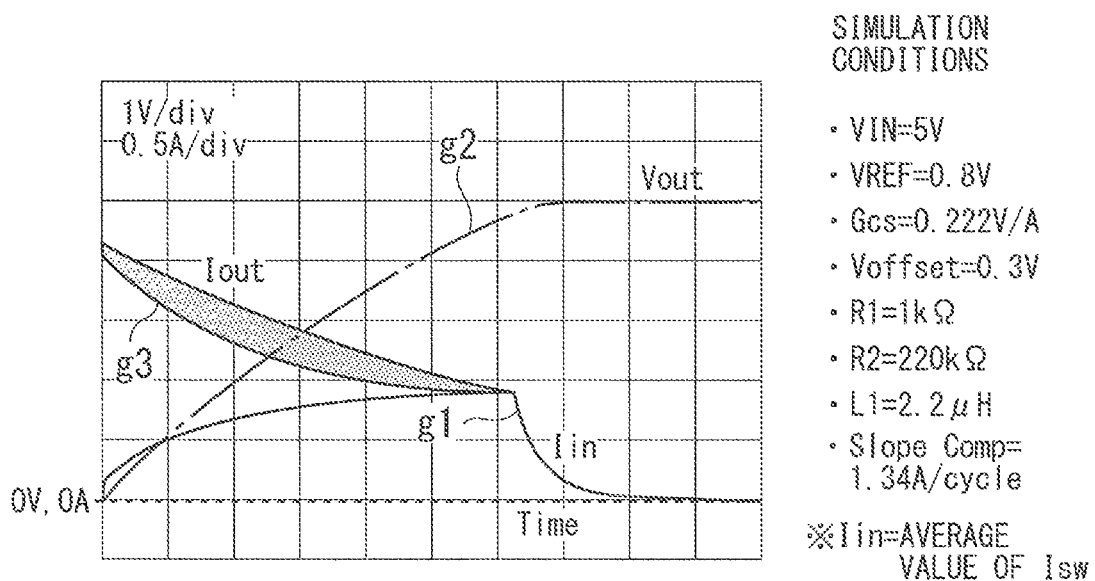
FIG. 2 is a diagram showing an example of charge current characteristics of the embodiment 1.

FIG. 2 exemplifies charge current characteristics of the switching regulator 11. The charge current characteristics in FIG. 2 are a result of simulation analysis of the charge control device 10 shown in FIG. 1, assuming that the input voltage of the VIN terminal as "5 V", the reference voltage VREF is "0.8 V", the gain value (Gcs) is "0.222 V/A", the offset voltage (Voffset) is "0.3 V", the slope compensation signal is "1.34 A/cycle", the voltage dividing resistance R1 is "1 kΩ", the voltage dividing resistance R2 is "220 kΩ", and the inductor element L1 is "2.2 µH". The gain value (Gcs) is a gain value, assuming that an impedance Ron is "100 kΩ" and an impedance DCR of the inductor element L1 is "140 kΩ" in the switching regulator 11 when the switching element SW1 is ON.

In FIG. 2, a graph g1 shows a temporal change of an average value (Iin) of the current ISW flowing between the VIN terminal and the source of the switching element SW1 when the switching elements SW1 and SW2 are in operation. Similarly, a graph g2 shows a temporal change of the charge voltage value (Vout) of the capacitor C1 and a graph g3 shows a temporal change of the current value (Iout) supplied to the capacitor C1 through the inductor element L1. A vertical axis in FIG. 2 indicates a current value (0.5 A/div) and a voltage value (1 V/div), while a lateral axis indicates normalized time elapse. A broken line in parallel with the lateral axis indicates a 0 V standard and a 0 A standard in FIG. 2.

As shown in the graph g2, the charge voltage value (Vout) of the capacitor C1 is changed so as to gently rise with the time elapse from start of the switching operation and reaches the constant voltage value determined by the charge capacity of the capacitor C1. Moreover, as shown in the graph g1, the current value (Iin) flowing into the switching regulator 11 during the switching operation gently rises with the time elapse from the start of the switching operation and reaches a constant state within a range from 0.9 A to 1.0 A. From the relative temporal changes in the graph g1 and the graph g2, it is known that the current value (Iin) flowing into the switching regulator 11 reaches the constant state within the range from 0.9 A to 1.0 A in the vicinity of the full-charged capacity or the capacitor C1. It is known that the charge control device 10 shown in FIG. 1 performs the charge operation while the current value (Iin) flowing into the switching regulator 11 is suppressed to the constant state according to the charge capacity of the capacitor C1.

Moreover, as shown in a graph g3, the current value (Iout) supplied to the capacitor C1 with the switching operation of the switching regulator 11 gently decreases with the time elapse from the start of the switching operation and reaches the constant state within the range of 0.9 A to 1.0 A. A hatched region in the graph g3 indicates a change margin of the current value (Iout) pulsated with the switching operations of the switching elements SW1 and SW2.

It is known that the current value (Iout) involved in the switching operation of the switching regulator 11 makes a temporal change so as to become the same value as the current value (Iin) having reached the constant state in accordance with the charge capacity of the capacitor C1. It is known that the charge control device 10 shown in FIG. 1 performs charging by decreasing the current value (Iout) with an increase in the charge amount (charge voltage value (Vout)), while the current value (Iout) exceeding 2A is supplied to the capacitor C1 at the start of the switching operation.

Embodiment 2

Block Configuration

The form of the charge control device 10 described in the embodiment 1 is a form in which the output voltage (Vcomp) output to the COMP terminal is input into the FB terminal as a bias voltage through the voltage dividing resistance (R1, R2) grounded to the GND of the vehicle. In the charge control device 10, the output voltage (Vcomp) output to the COMP terminal is divided through the voltage dividing resistance (R1, R2) pulled up to the power supply side, and the divided voltage may be input into the FB terminal as the bias voltage.

In the form in which the voltage dividing resistance (R1, R2) is pulled up to the power supply side, the output voltage value output from the COMP terminal can be set to a voltage value lower than the reference voltage VREF. The charge control device 10 can relatively suppress intensity of the current value (Iin) flowing into the switching regulator 11 during the switching operation as compared with the form of the charge control device 10 shown in FIG. 1 by performing the switching operation on the basis of the output voltage value set to a voltage value lower than the reference voltage VREF. In the form of the embodiment 2, the charge control device 10 which reduces a load to an electricity supply capability on the onboard apparatus side can be provided.

Figure 3:
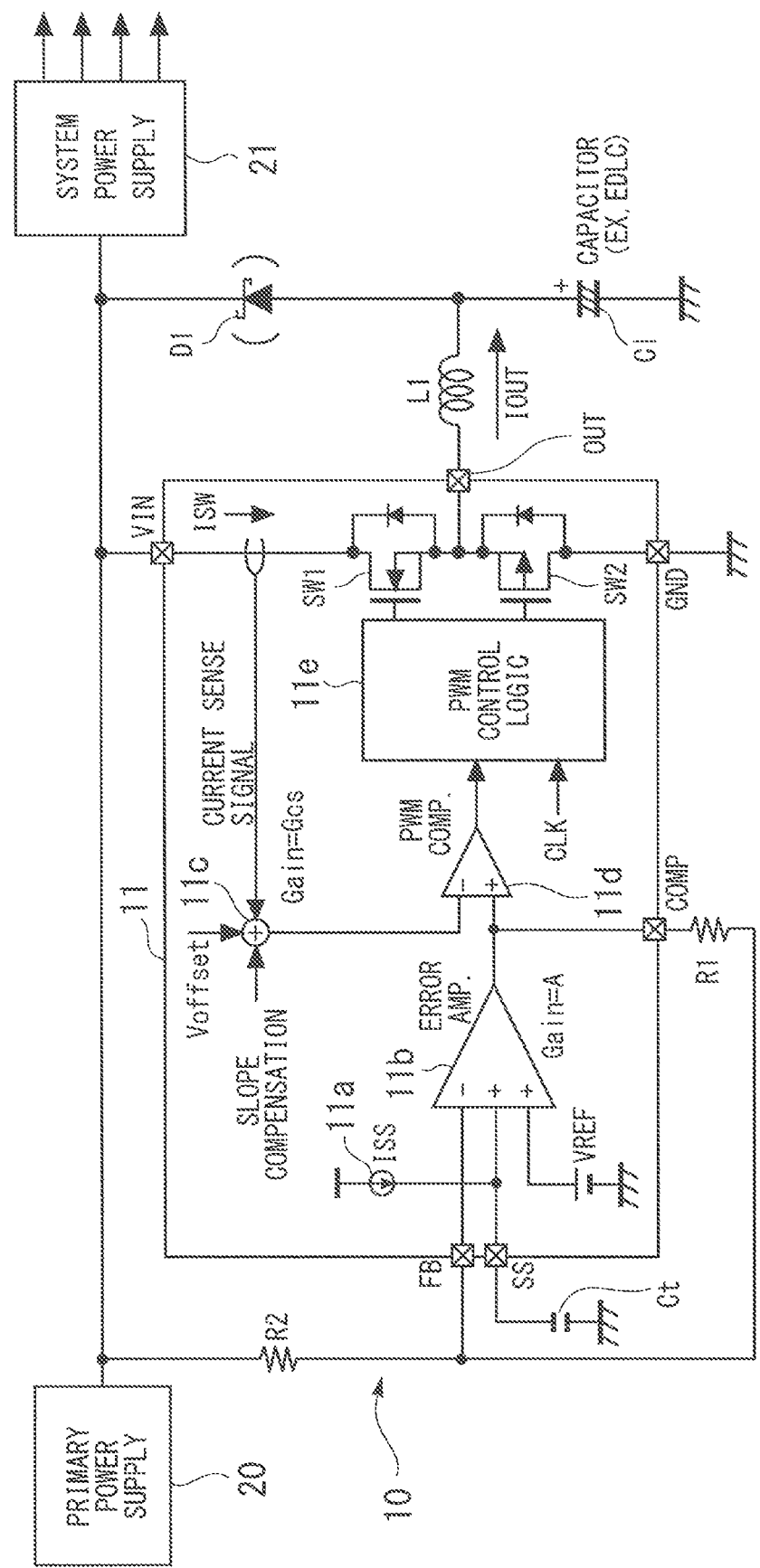
FIG. 3 is a diagram showing an example of a block configuration of a charge control device in an embodiment 2.

FIG. 3 is a diagram showing an example of a block configuration of the charge control device 10 according to the embodiment 2 (hereinafter referred to also as "the embodiment"). A form of the charge control device 10 shown in FIG. 3 is a form in which the output voltage (Vcomp) output to the COMP terminal is feed-back input into the FB terminal through the voltage dividing resistance (R1, R2) pulled up to the primary power supply 20 side.

One end of the voltage dividing resistance R1 is connected to the COMP terminal, while the other end is connected to the FB terminal. Moreover, the other end of the voltage dividing resistance R1 connected to the FB terminal is connected to the other end of the voltage dividing resistance R2 with one end pull-up connected to the primary power supply 20 side. In the block configuration shown in FIG. 3, the constitution other than the voltage dividing resistance (R1, R2) is similar to the constitution in FIG. 1. Hereinafter, the charge control operation of the charge control device 10 of the embodiment will be described mainly on the constitution different from that in FIG. 1.

(Charge Control Operation)

In the switching regulator 11 in the form shown in FIG. 3, the output voltage (Vcomp) of the error amplifier 11b divided through the voltage dividing resistance (R1, R2) pull-up connected to the primary power supply 20 side is input as the feedback voltage to the inverted input terminal of the error amplifier 11b.

The error amplifier 11b amplifies the differential voltage (error) between the feedback voltage input into the FB terminal and the reference voltage VREF by the predetermined gain (A) and outputs the amplified differential voltage as an error signal to the output terminal. The output voltage (Vcomp) of the error amplifier 11b is output to the COMP terminal of the switching regulator 11.

In the form of the embodiment 2, the voltage relationship between the output voltage (Vcomp) output to the COMP terminal and the reference voltage VREF is expressed by the formula (3) shown below:

$$Vcomp = VREF - \frac{R1}{R2} \times (VIN - VREF) \quad \text{Formula (3)}$$

(calculated as $A = \infty$)

In the form of the second embodiment 2, too, by setting the value of the voltage dividing resistance (R1, R2) connected to the COMP terminal in advance in accordance with the predetermined gain (A) of the error amplifier 11b, the reference voltage VREF, and the voltage on the primary power supply 20 side, an arbitrary voltage according to the voltage dividing resistance (R1, R2) value can be output to the output terminal of the error amplifier 11b. In the charge control device 10, the current ISW flowing between the source and the drain electrically conducted in the ON period of the switching element SW1 can be controlled by controlling the output voltage (Vcomp) of the error amplifier 11b of the switching regulator 11.

Similarly to the embodiment 1, the relationship between the current ISW and the output voltage (Vcomp) of the error amplifier 11b is expressed by the following formula (4):

$$ISW(\text{peak}) = Gcs \times (Vcomp - Voffset) \quad \text{Formula (4)}$$

※ISW (peak)=Peak value of the ripple current in ISW

As shown in the formula (4), in the form of the embodiment 2, too, the charge control device 10 can control the value of the current ISW flowing in between the source and the drain during the ON period of the switching element SW1 of the switching regulator 11 to a constant current value according to the reference voltage VREF and the voltage dividing resistance (R1, R2) values pulled up to the power supply side. The switching regulator 11 of the charge control device 10 can supply the current ISW according to accuracy of the reference voltage VREF to the capacitor C1. In the charge control device 10 in the embodiment 2, too, a charge circuit capable of quick charge while the current charged in the capacitor is controlled can be provided by using the general-purpose switching regulator with a large communication amount.

(Charge Current Characteristic)

Figure 4:
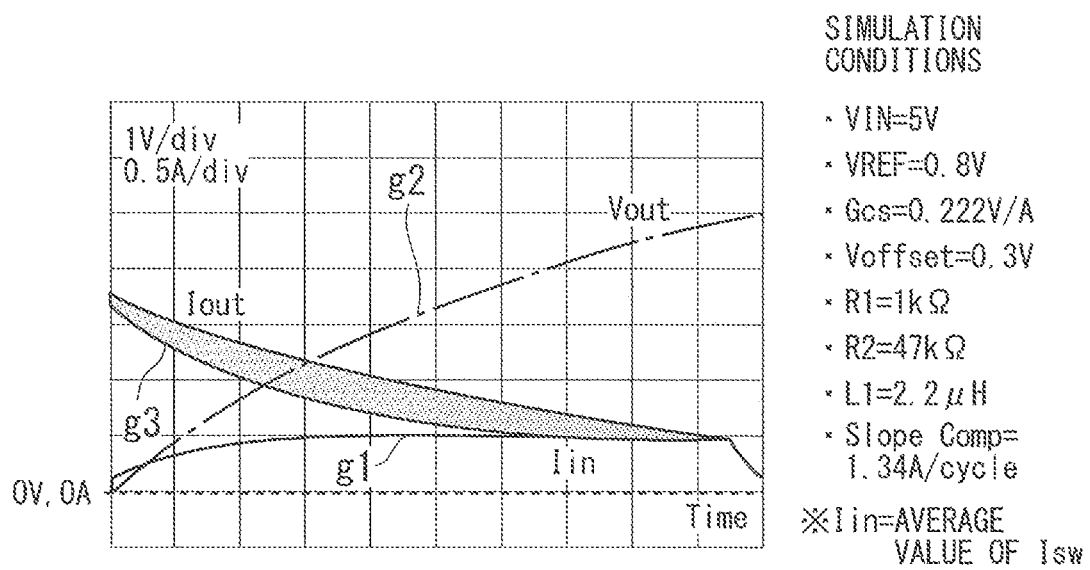
FIG. 4 is a diagram showing an example of charge current characteristics of the embodiment 2.

FIG. 4 exemplifies charge current characteristics of the switching regulator 11. The charge current characteristics in FIG. 4 are a result of simulation analysis of the charge control device 10 shown in FIG. 3, assuming that the input voltage of the VIN terminal is "5 V", the reference voltage VREF is "0.8 V", the gain value (Gcs) is "0.222 V/A", the offset voltage (Voffset) is "0.3 V", the slope compensation signal is "1.34 A/cycle", the voltage dividing resistance R1 is "1 kΩ", the voltage dividing resistance R2 is "47 kΩ", and the inductor element L1 is "2.2 μH". The gain value (Gcs) is similar to that in FIG. 2.

In FIG. 4, a graph g1 shows a temporal change of an average value (Iin) of the current ISW flowing between the VIN terminal and the source of the switching element SW1 during the switching operations of the switching elements SW1 and SW2. A graph g2 shows a temporal change of the charge voltage value (Vout) of the capacitor C1 and a graph g3 shows a temporal change of the current value (Iout) supplied to the capacitor C1 through the inductor element L1. A vertical axis in FIG. 4 indicates a current value (0.5 A/div) and a voltage value (1 V/div), while a lateral axis indicates normalized time elapse. A broken line in parallel with the lateral axis indicates the 0 V standard and the 0 A standard in FIG. 2.

Temporal change tendencies of the graphs g1, g2, and g3 shown in FIG. 4 indicate change tendencies similar to those in the embodiment 1. However, the current value (Iin) flowing into the switching regulator 11 during the switching operation reaches the constant state in the vicinity of 0.5 A. Moreover, the current value (Iout) supplied to the capacitor C1 at the start of the switching operation lowers to the vicinity of 1.75 A.

When the temporal change tendencies of the graphs g1 to g3 shown in FIG. 2 and the temporal change tendencies of the graphs g1 to g3 shown in FIG. 4 are compared, it is known that the relative intensities of the current value (Iin) flowing into the switching regulator 11 during the switching operation and the current value (Iout) supplied to the capacitor C1 are suppressed. However, a period taken for charging the capacitor C1 tends to be relatively longer by a relative decrease of the current value (Iout) supplied to the capacitor C1.

Embodiment 3

Block Configuration

Figure 5:
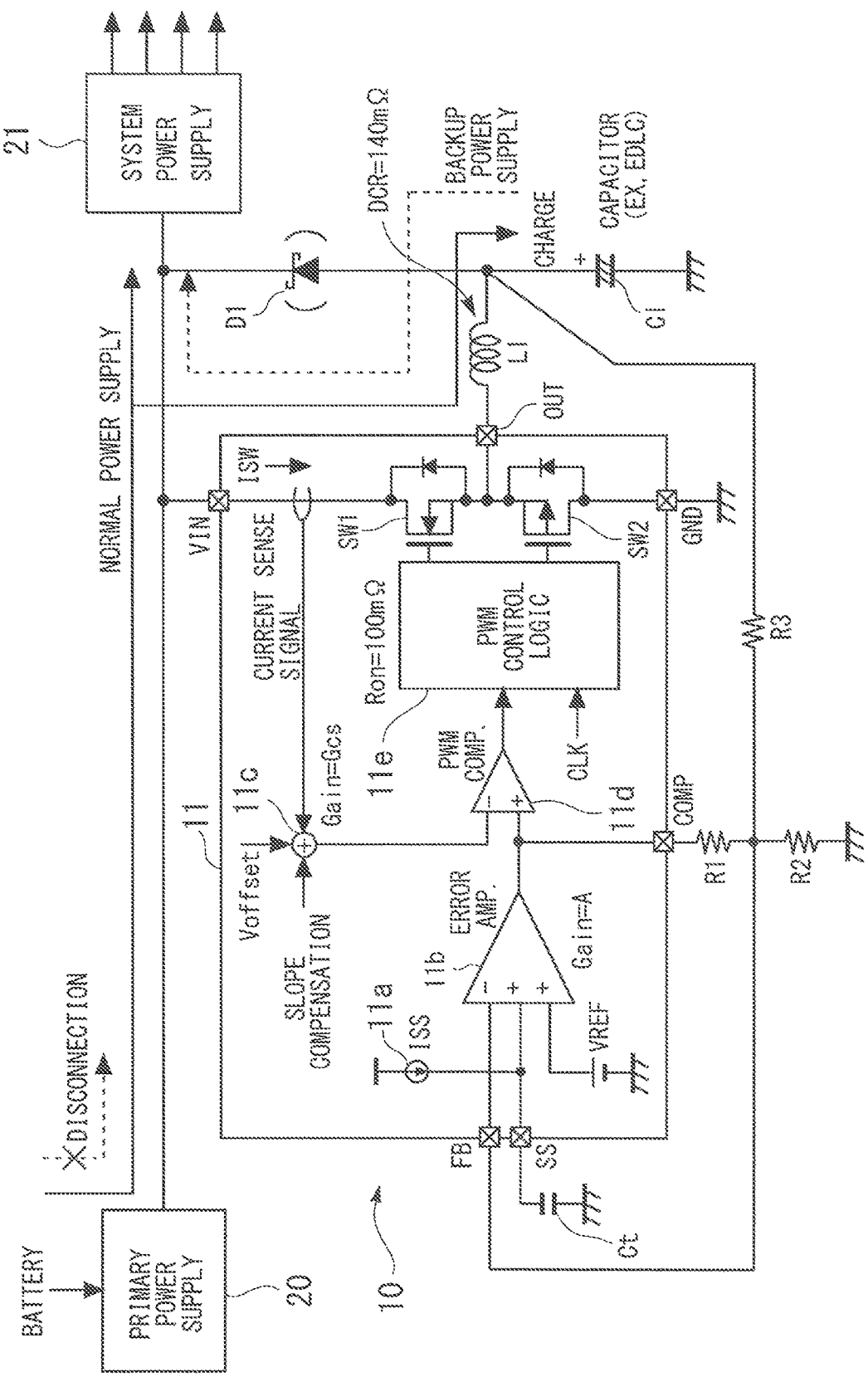
FIG. 5 is a diagram showing an example of a block configuration of a charge control device in an embodiment 3.

FIG. 5 is a diagram showing an example of a block configuration of the charge control device 10 according to an embodiment 3 (hereinafter referred to also as "the embodiment"). The charge control device 10 shown in FIG. 5 is a form in which the charge voltage (Vout) charged in the capacitor C1 is reflected as a feedback amount with respect to the form of the charge control device 10 described in the embodiment 1.

The charge control device 10 of the embodiment includes at least the switching regulator 11, the inductor element L1, and resistances R1, R2, and R3. The resistances R1, R2, and R3 constitute voltage dividing resistances. In the block configuration shown in FIG. 5, the constitution other than the voltage dividing resistances (R1, R2, R3) is similar to the constitution in FIG. 1.

One end of the voltage dividing resistance R1 is connected to the COMP terminal, while the other end is connected to the FB terminal. The other end of the voltage dividing resistance R1 connected to the FB terminal is connected to the other end of the voltage dividing resistance R2 with one end grounded to the GND of the vehicle. One end of the voltage dividing resistance R3 is connected to a positive electrode-side terminal of the capacitor C1, while the other end is connected to the other end of the voltage dividing resistance R1 connected to the FB terminal.

In the charge control device 10 of the embodiment 3, the charge voltage (Vout) of the capacitor C1 is negative-feedback input into the inverted terminal of the error amplifier 11b through the voltage dividing resistance R3, whereby the current value (Iin) flowing into the switching regulator 11 during the switching operation can be controlled in accordance with the charged state of the capacitor C1. In the onboard apparatus such as a drive recorder or the like including the charge control device 10 of the embodiment, for example, when the current capacity of the primary power supply 20 or the current amount capable of supply in the battery is limited, adjustment of the current value (Iin) flowing into the switching regulator 11 during the switching operation can be made possible in accordance with the limited current amount. Hereinafter, the charge control operation of the charge control device 10 in the embodiment will be described mainly on the constitution different from that in FIG. 1.

(Charge Control Operation)

In the switching regulator 11 in a form shown in FIG. 5, the charge voltage (Vout) of the capacitor C1 divided through the voltage dividing resistance R3 and the output voltage (Vcomp) of the error amplifier 11b divided by the voltage dividing resistance (R1, R2) are input as the feedback voltage into the inverted input terminal of the error amplifier 11b.

The error amplifier 11b amplifies the differential voltage (error) between the feedback voltage input into the FB terminal and the reference voltage VREF by the predetermined gain (A) and outputs the amplified differential voltage as an error signal to the output terminal. The output voltage (Vcomp) of the error amplifier 11b is output to the COMP terminal of the switching regulator 11.

In the form of the embodiment 3, the voltage relationship between the output voltage (Vcomp) output to the COMP terminal and the reference voltage VREF is expressed by the formula (5) shown below:

$$Vcomp = VREF + R1 \times \left( \frac{VREF}{R2} - \frac{Vout - VREF}{R3} \right) \quad \text{Formula (5)}$$

(calculated as $A = \infty$)

As shown in the formula (5), by setting each value of the voltage dividing resistances (R1, R2, R3) in advance in accordance with the predetermined gain (A) of the error amplifier 11b, a voltage according to the charge voltage (Vout) of the capacitor C1 can be output to the output terminal of the error amplifier 11b. The charge control device 10 can reflect the charge voltage (Vout) of the capacitor C1 in the control of the current ISW flowing between the source and the drain electrically conducted during the ON period of the switching element SW1 by controlling the output voltage (Vcomp) of the error amplifier 11b of the switching regulator 11.

Similarly to the embodiment 1, the relationship between the current ISW and the output voltage (Vcomp) output to the COMP terminal is expressed by the following formula (6):

$$ISW(\text{peak}) = Gcs \times (Vcomp - Voffset) \quad \text{Formula (6)}$$

※ISW (peak)=Peak value of the ripple current in ISW

As shown in formula (6), the charge control device 10 of the embodiment can control the value of the current ISW flowing in between the source and the drain during the ON period of the switching element SW1 of the switching regulator 11 to the constant current value according to the reference voltage VREF and the voltage dividing resistance (R1, R2, R3) values.

(Charge Current Characteristics)

Figure 6:
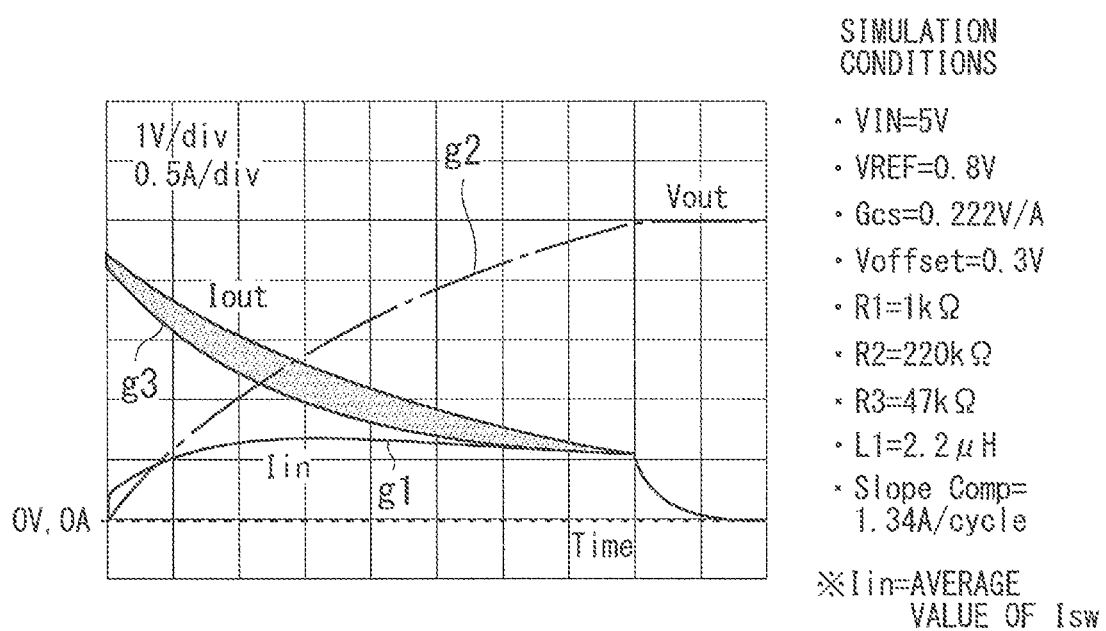
FIG. 6 is a diagram showing an example of charge current characteristics of the embodiment 3.

FIG. 6 is a diagram showing an example of the charge current characteristics by the charge control device 10 of the embodiment. The charge current characteristics in FIG. 6 are a result of simulation analysis of the charge control device 10 shown in FIG. 5, assuming that the input voltage of the VIN terminal is "5 V", the reference voltage VREF is "0.8 V", the gain value (Gcs) is "0.222 V/A", the offset voltage (Voffset) is "0.3 V", the slope compensation signal is "1.34 A/cycle", the voltage dividing resistance R1 is "1 kΩ", the voltage dividing resistance R2 is "220 kΩ", the voltage dividing resistance R3 is "47 kΩ", and the inductor element L1 is "2.2 µH". The gain value (Gcs) is similar to that in FIG. 2.

In FIG. 6, a graph g1 shows a temporal change of an average value (Iin) of the current ISW flowing between the VIN terminal and the source of the switching element SW1 during the switching operations of the switching elements SW1 and SW2. A graph g2 shows a temporal change of the charge voltage value (Vout) of the capacitor C1 and a graph g3 shows a temporal change of the current value (Iout) supplied to the capacitor C1 through the inductor element L1. A vertical axis in FIG. 6 indicates a current value (0.5 A/div) and a voltage value (1 V/div), while a lateral axis indicates normalized time elapse. A broken line in parallel with the lateral axis indicates the 0 V standard and the 0 A standard.

As shown in the graph g1, the current value (Iin) flowing into the switching regulator 11 during the switching operation gently rises/changes with the time elapse from the start of the switching operation and reaches the maximum value of approximately 0.7 A. The current value (Iin) after having reached the maximum value changes to the constant state within the range from 0.7 A to 0.5 A or slightly decreases with the time elapse.

It is known from relative temporal changes in the graph g1 and the graph g2 that the current value (Iin) reaches a maximum value when the charged state of the capacitor C1 is in the vicinity of approximately a half of a full-charged capacity. Moreover, by comparing the temporal change tendency of the graph g1 shown in FIG. 2 with the temporal change tendency of the graph g1 shown in FIG. 4, it is known that relative intensity of the current value (Iin) flowing into the switching regulator 11 during the switching operation is suppressed. Moreover, it is known that a period taken for charging the capacitor C1 tends to be relatively longer by a relative decrease of the current value (Iout) supplied to the capacitor C1. The temporal change tendencies of the graphs g2 and g3 shown in FIG. 6 show the change tendency similar to that in the embodiment 1.

In the charge control device 10 in the embodiment, when the current capacity of the primary power supply 20 or the current amount capable of supply in the battery is limited, the capacitor C1 can be charged while the maximum value of the current value (Iin) flowing into the switching regulator 11 during charging is suppressed in accordance with the charged state.

Embodiment 4

Block Configuration

Figure 7:
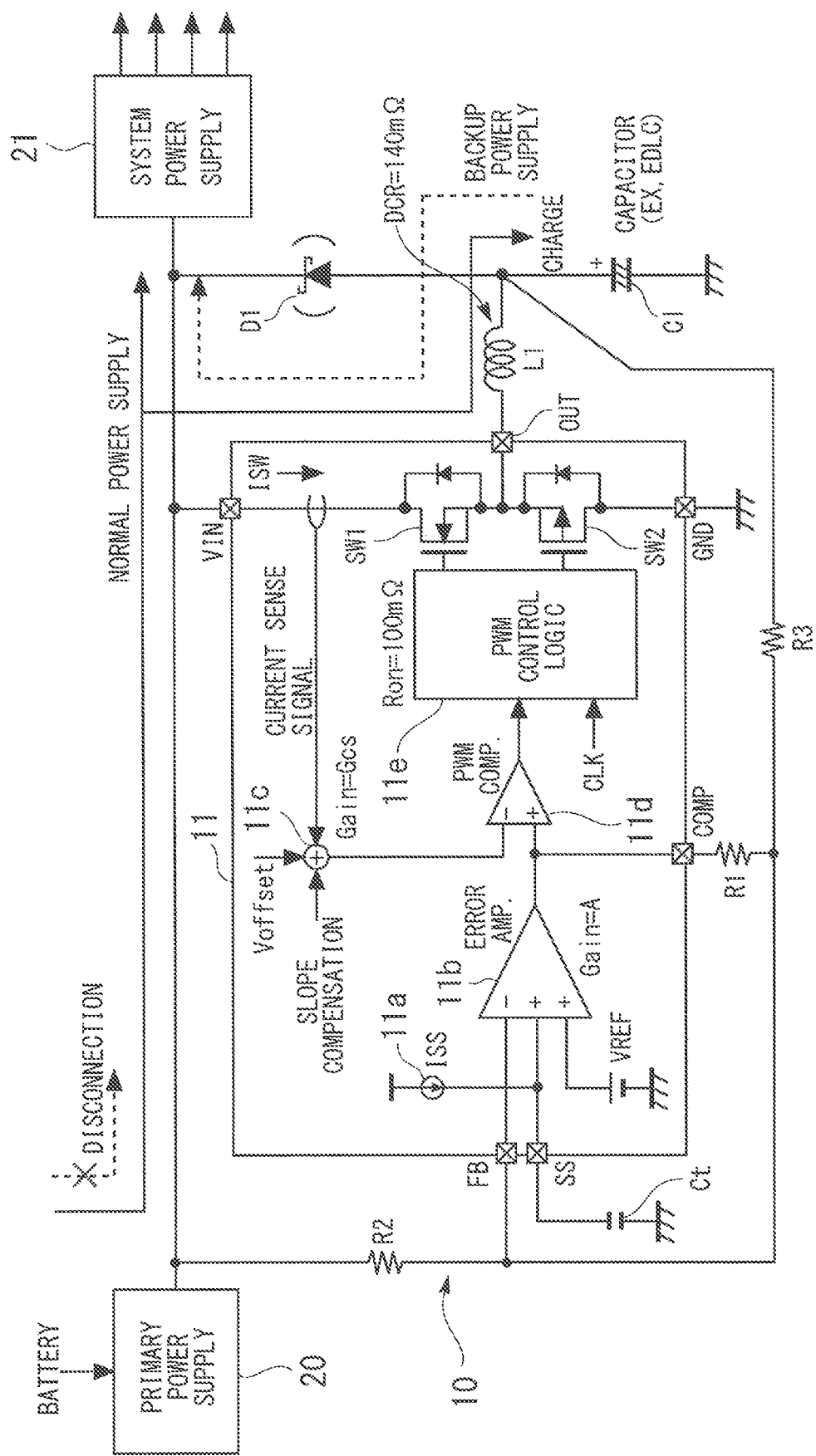
FIG. 7 is a diagram showing an example of a block configuration of a charge control device in an embodiment 4.

FIG. 7 is a diagram showing an example of a block configuration of the charge control device 10 according to an embodiment 4 (hereinafter referred to also as "the embodiment"). The charge control device 10 shown in FIG. 7 is a form in which the charge voltage (Vout) charged in the capacitor C1 is further reflected as a feedback amount with respect to the form of the charge control device 10 described in the embodiment 2.

The charge control device 10 shown in FIG. 7 includes at least the switching regulator 11, the inductor element L1, and resistances R1, R2, and R3 constituting the voltage dividing resistances. One end of the voltage dividing resistance R1 is connected to the COMP terminal, while the other end is connected to the FB terminal. The other end of the voltage dividing resistance R1 connected to the FB terminal is connected to the other end of the voltage dividing resistance R2 with one end pull-up connected to the primary power supply 20 side. One end of the voltage dividing resistance R3 is connected to the positive electrode-side terminal of the capacitor C1, while the other end is connected to the other end of the voltage dividing resistance R1 connected to the FB terminal. In the block configuration shown in FIG. 7, the constitution other than the voltage dividing resistances (R1, R2, R3) is similar to the constitution in FIG. 3. Hereinafter the charge control operation of the charge control device 10 of the embodiment will be described mainly on the constitution different from that in FIG. 3.

(Charge Control Operation)

In the charge control device 10 of the embodiment 4, the current value (Iin) flowing into the switching regulator 11 during the switching operation can be controlled in accordance with the charged state of the capacitor C1 by negative-feedback input of the charge voltage (Vout) of the capacitor C1 into the inverted terminal of the error amplifier 11b through the voltage dividing resistance R3.

In the switching regulator 11 in the form shown in FIG. 7, the charge voltage (Vout) of the capacitor C1 divided through the voltage dividing resistance R3 and the output voltage (Vcomp) of the error amplifier 11b divided by the voltage dividing resistance (R1, R2) pull-up connected to the primary power supply 20 side are input as the feedback voltage into the inverted input terminal of the error amplifier 11b.

The error amplifier 11b amplifies the differential voltage (error) between the feedback voltage input into the FB terminal and the reference voltage VREF by the predetermined gain (A) and outputs the simplified differential voltage as an error signal to the output terminal. The output voltage (Vcomp) of the error amplifier 11b is output to the COMP terminal of the switching regulator 11.

In the form of the embodiment 4, the voltage relationship between the output voltage (Vcomp) output to the COMP terminal and the reference voltage VREF and the relationship between the current ISW and the output voltage (Vcomp) of the error amplifier 11b are expressed by the formula (7) shown below:

$$Vcomp = VREF - R1 \times \left( \frac{VIN - VREF}{R2} - \frac{Vout - VREF}{R3} \right) \quad \text{Formula (7)}$$

(calculated as $A = \infty$)

$ISW(\text{peak}) = Gcs \times (Vcomp - Voffset)$

※$ISW$ (peak) = Peak value of the ripple current in $ISW$

In the form of the embodiment 4, too, the voltage according to the charge voltage (Vout) of the capacitor C1 can be output to the output terminal of the error amplifier 11b by setting each value of the voltage dividing resistances (R1, R2, R3) in advance in accordance with the predetermined gain (A) of the error amplifier 11b, the reference voltage VREF, and the voltage on the primary power supply 20 side.

The charge control device 10 can reflect the charge voltage (Vout) of the capacitor C1 in the control of the current ISW flowing between the source and the drain electrically conducted during the ON period of the switching element SW1 by controlling the output voltage (Vcomp) of the error amplifier 11b of the switching regulator 11. The charge control device 10 can control the value of the current ISW flowing into the source and the drain during the ON period of the switching element SW1 of the switching regulator 11 to a constant current value according to the reference voltage VREF and the voltage dividing resistance (R1, R2, R3) values.

(Charge Current Characteristics)

Figure 8A:
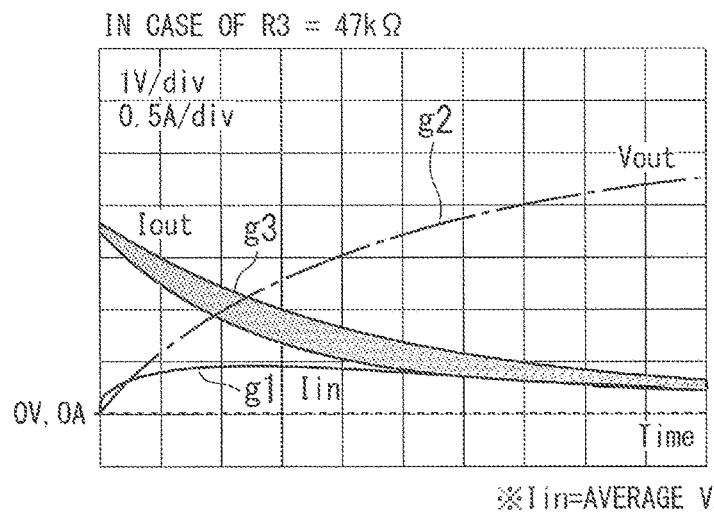
FIG. 8A is a diagram showing an example of charge current characteristics of the embodiment 4.
Figure 8B:
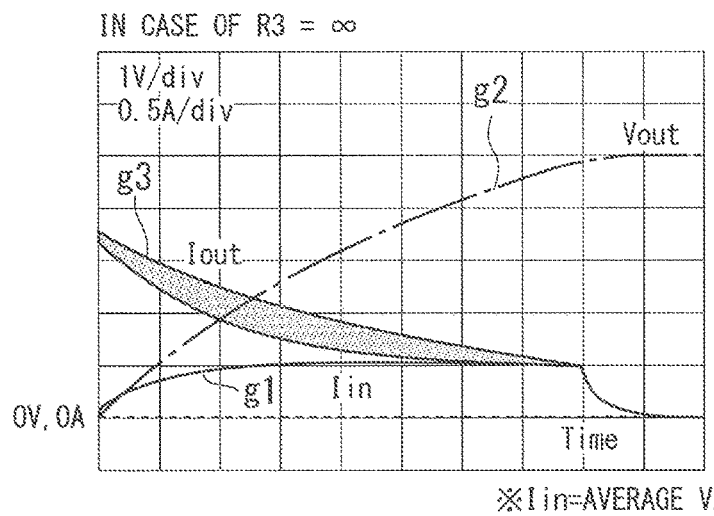
FIG. 8B is a diagram showing an example of charge current characteristics of the embodiment 4.

FIGS. 8A and 8B are a diagram showing an example of the charge current characteristics by the charge control device 10 of the embodiment. The charge current characteristics in FIG. 8A are at result of simulation analysis of the charge control device 10 shown in FIG. 7, assuming that the input voltage of the VIN terminal is "5 V", the reference voltage VREF is "0.8 V", the gain value (Gcs) is "0.222 V/A", the offset voltage (Voffset) is "0.3 V", the slope compensation signal is "1.34 A/cycle", the voltage dividing resistance R1 is "1 kΩ", the voltage dividing resistance R2 is "220 kΩ", the voltage dividing resistance R3 is "47 kΩ", and the inductor element L1 is "2.2 µH". Moreover, the charge current characteristics in FIG. 8B are a simulation analysis result when the voltage dividing resistance R3 is set infinite in the various conditions. The gain value (Gcs) is similar to that in FIG. 2.

In FIGS. 8A and 8B, a graph g1 snows a temporal change of an average value (Iin) of the current ISW flowing between the VIN terminal and the source of the switching element SW1 during the switching operations of the switching elements SW1 and SW2. A graph g2 shows a temporal charge of the charge voltage value (Vout) of the capacitor C1 and a graph g3 shows a temporal change of the current value (Iout) supplied to the capacitor C1 through the inductor element L1. A vertical axis in each of FIGS. 8A and 8B indicates a current value (0.5 A/div) and a voltage value (1 V/div), while a lateral axis indicates normalized time elapse. A broken line in parallel with the lateral axis indicates the 0 V standard and the 0 A standard.

As shown in FIG. 8A, when the voltage dividing resistance R3 is "47 kΩ", the maximum value of the current value (Iin) is approximately 0.4 A and thus, the charge period is scaled out. In order to specify the temporal change tendency in each graph in the embodiment 4, simulation analysis was made with the voltage dividing resistance R3 to be infinite. As a result, as shown in FIG. 8B, it was confirmed that the temporal change tendencies in the graphs g1, g2, and g3 show the change tendencies similar to that in the embodiment 3.

In FIG. 8B, the current value (Iin) flowing into the switching regulator 11 during the switching operation gently rises/changes with the time elapse from the start of the switching operation and reaches the maximum value of approximately 0.6 A. It was confirmed that the current value (Iin) after having reached the maximum value changes to the constant state within the range from 0.6 A to 0.5 A or slightly decreases with the time elapse, similarly to the embodiment 3. It was confirmed from the relative temporal changes of the graph g1 and the graph g2 that the current value (Iin) reaches the maximum value when the charged state of the capacitor C1 is in the vicinity of approximately a half of the full-charged capacity. Moreover, it is known from comparison of the temporal change tendencies between the graph g1 shown in FIG. 8A and the graph g1 shown in FIG. 8B that the current value (Iin) increases/decreases in accordance with the intensity relationship of the voltage dividing resistance R3.

The charge control device 10 of the embodiment can charge the capacitor C1 while the maximum value of the current value (Iin) flowing into the switching regulator 11 during charging is suppressed in accordance with the charged state when there is limitation on the current capacity of the primary power supply 20 or the current amount capable of supply of the battery similarly to the embodiment 3.

Embodiment 3

Block Configuration

Figure 9:
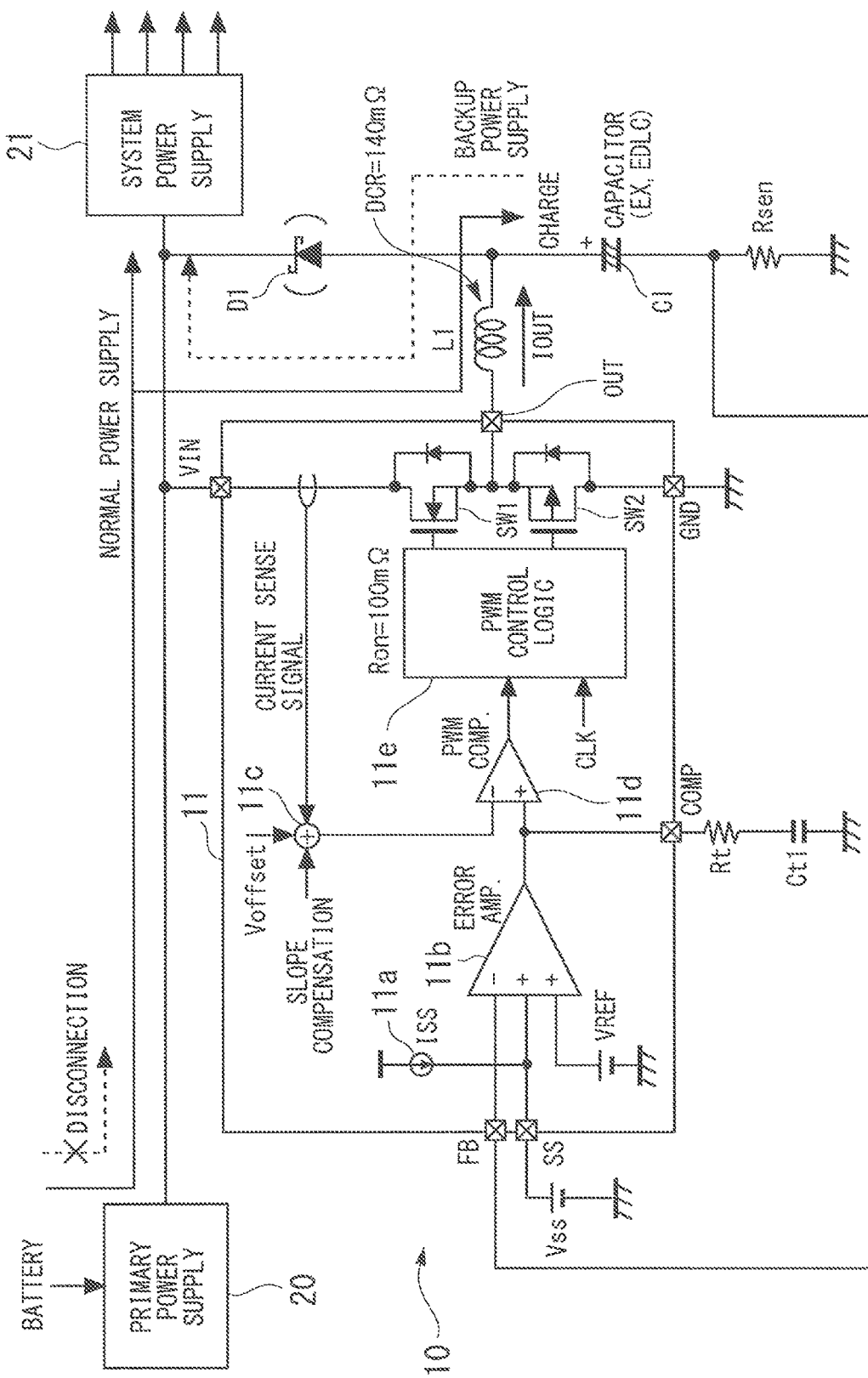
FIG. 9 is a diagram showing an example of a block configuration of a charge control device in an embodiment 5.

FIG. 9 is a diagram showing an example of a block configuration of the charge control device 10 according to an embodiment 5 (hereinafter referred to also as "the embodiment"). In the embodiment, the charge control device 10 applies bias voltage Vss from outside of the switching regulator 11 to the SS terminal. And the charge control device 10 according to the embodiment executes current control of supplying a constant current to the capacitor C1 on the basis of the bias voltage Vss and the feedback voltage input into the FB terminal. In the charge control device 10 according to the embodiment, constant current control of the switching regulator 11 not depending on the charge voltage (Vout) or the capacitor C1 is provided.

The charge control device 10 shown in FIG. 9 includes at least the switching regulator 11, the inductor element L1, a unit that applies the bias voltage Vss (hereinafter also referred to simply as the "bias voltage Vss"), and a resistance Rsen.

The bias voltage Vss is a unit that applies the predetermined bias voltage Vss by connecting to an SS terminal of the switching regulator 11, for example. The resistance Rsen is a resistance device with one end connected to the FB terminal. In the embodiment, the resistance Rsen is provided between the negative electrode-side terminal of the capacitor C1 constituting a power supply for backup and the GND. The other end of the resistance Rsen connected to the FB terminal is grounded to the GND of the vehicle. In the embodiment, a potential difference between the negative electrode-side terminal of the capacitor C1 and the GND is detected as a feedback voltage through the resistance Rsen.

As already described above, the capacitor C1 constitutes a part of the power supply for backup provided in the power receiving unit of the onboard apparatus. When the potential difference between the negative electrode-side terminal of the capacitor C1 and the GND is to be negative-feedback input into the FB terminal by using the resistance Rsen, the charged power is backup supplied to the capacitor C1 including the resistor Rsen and the diode element D1. Thus, a resistance value of the resistance Rsen that detects the potential difference between the negative electrode-side terminal of the capacitor C1 and the GND as the feedback voltage is preferably as small as possible. By making the resistance value of the resistance Rsen small, a load loss of the power during the backup operation can be reduced.

The COMP terminal of the switching regulator 11 is grounded to the GND of the vehicle through a resistance Rt and a capacitor Ct1. In the switching regulator 11, a switching band during the switching operation is limited on the basis of a time constant determined by a value of the resistance Rt and a value of the capacitor Ct1 connected to the COMP terminal. Since the switching band is limited, low-harmonic oscillation by the phase difference of the voltage change and the current change during the switching operation, for example, is suppressed.

In the block configuration shown in FIG. 9, the constitution other than the bias voltage Vss and the resistance Rsen is similar to the constitution in FIG. 1. Hereinafter, the charge control operation of the charge control device 10 of the embodiment will be described mainly on the constitution different from that in FIG. 1.

(Charge Control Operation)

The bias voltage Vss connected to the SS terminal outside the switching regulator 11 is input into the non-inverted input terminal of the error amplifier 11b. Moreover, the potential difference between the negative electrode-side terminal of the capacitor C1 and the GND detected through the resistance Rsen is input into the inverted input terminal of the error amplifier 11b through the FB terminal. As already described, the reference voltage VREF is input into the non-inverted input terminal other than the non-inverted input terminal to which the bias voltage Vss is input in the two non-inverted input terminals of the error amplifier 11b.

In the operation of the error amplifier 11b, the non-inverted input terminal with a relatively low voltage value takes preference in the voltage values input into the two non-inverted input terminals. Here, the voltage value of the reference voltage VREF is set to approximately from 0.6 to 1.0 V. Therefore, by setting the voltage value of the bias voltage Vss connected to the SS terminal outside the switching regulator 11 to less than the reference voltage VREF, the operation of the error amplifier 11b based on the differential voltage (error) between the feedback voltage input into the FB terminal and the bias voltage Vss input into the SS terminal is made possible.

The error amplifier 11b amplifies the differential voltage (error) between the feedback voltage input into the FB terminal and the bias voltage Vss by the predetermined gain (A) and outputs the amplified differential voltage as an error signal to the output terminal.

In the embodiment, too, the switching regulator 11 generates the gate control signal on the basis of a comparison result between the voltage value of the slope waveform input into the inverted terminal of the comparator 11d and the output voltage value of the error amplifier 11b input into the non-inverted terminal. In the embodiment, too, the charge control device 10 can control the current supplied to the capacitor C1 through the inductor element L1 during the switching operation, for example, by controlling the output voltage of the error amplifier 11b of the switching regulator 11.

Here, a relationship among a current average value (Ichg) of the current (Iout) supplied to the capacitor C1 through the inductor element L1, the bias voltage Vss, and the resistance Rsen is expressed by the following formula (8):

$$Ichg = Vss \div Rsen \qquad \text{Formula (8)}$$

$\overline{X}$·Ichg=Average value obtained by eliminating the ripple of IOUT

As shown in the formula (8), the charge control device 10 according to the embodiment can control the current average value (Ichg) supplied to the capacitor C1 through the inductor element L1 during the switching operation to the constant current value according to the bias voltage Vss and the resistance Rsen.

The resistance value of the resistance Rsen provided between the negative electrode-side terminal of the capacitor C1 and the GND is preferably as small as possible in order to suppress the load loss of the electricity during the backup operation as described above. As a setting example of the resistance Rsen and the bias voltage Vss, the resistance value of the resistance Rsen at "68 mΩ" and the voltage value of the bias voltage Vss at "0.1 V" can be presented, for example.

(Charge Current Characteristics)

Figure 10:
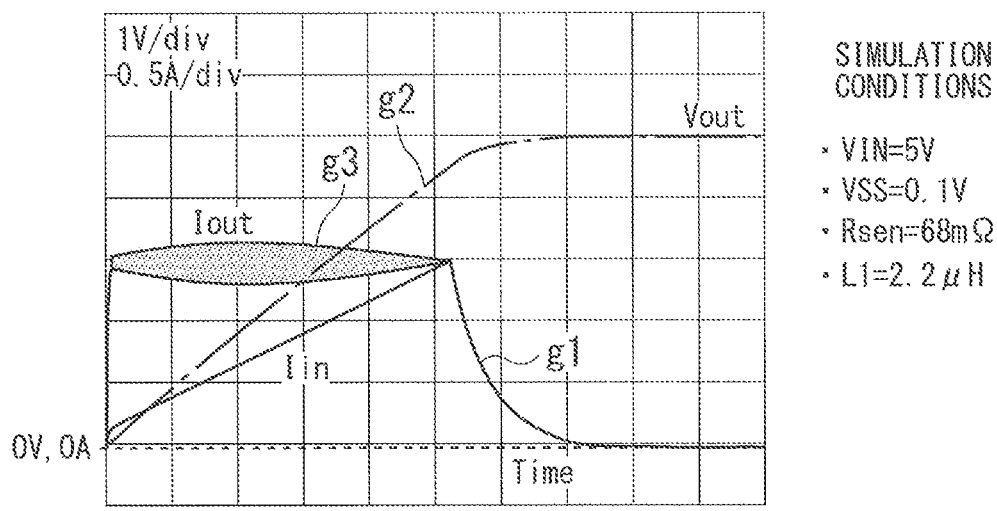
FIG. 10 is a diagram showing an example of charge current characteristics of the embodiment 5.

FIG. 10 is a diagram shoving an example of the charge current characteristics by the charge control device 10 of the embodiment. The charge current characteristics in FIG. 10 are a result of simulation analysis of the charge control device 10 shown in FIG. 9 assuming that the input voltage of the VIN terminal is "5 V", the bias voltage Vss is "0.1 V", the resistance Rsen is "68 mΩ", and the inductor element L1 is "2.2 μH".

In FIG. 10, a graph g1 shows a temporal change of the average value (Iin) of the current ISW flowing between the VIN terminal and the source of the switching element SW1 during the switching operations of the switching elements SW1 and SW2. A graph g2 shows a temporal change of the charge voltage value (Vout) of the capacitor C1, and a graph g3 shows a temporal change of the current value (Iout) supplied to the capacitor C1 through the inductor element L1. A vertical axis in FIG. 10 indicates a current value (0.5 A/div) and a voltage value (1 V/div), while a lateral axis indicates normalized time elapse, and a broken line in parallel with the lateral axis indicates the 0 V standard and the 0 A standard.

As shown in the graph g2, the charge voltage value (Vout) of the capacitor C1 changes as it gently rises with the rime elapse from the start of the switching operation and reaches the constant voltage value determined by the charge capacity of the capacitor C1. Moreover, as shown in the graph g3, the temporal change of the current value (Iout) supplied to the capacitor C1 changes in the constant state. It is known that regarding the current value (Iout), the current average value (Ichg) acquired by a relational equation expressed by the formula (8) changes around the vicinity of 1.5 A.

From the relative temporal changes of the graph g2 and the graph g3, it is known that the current value (Iout) supplied to the capacitor C1 changes in the constant state without depending on the charge voltage value (VOut) of the capacitor C1. As shown in the graph g1, it is known that the current value (Iin) flowing into the switching regulator 11 during the switching operation rises with constant inclination with the time elapse from the start of the switching operation and reaches the current average value (Ichg) acquired by the relational equation expressed by the formula (8) as the maximum value.

In the charge control device 10 in she embodiment, the average current value (Ichg) supplied to the capacitor C1 is determined by the bias voltage Vss input into the SS terminal and the resistance Rsen. In the embodiment, even if a current feedback loop relating to generation of the slope waveform described in the embodiment 1 to the embodiment 4 is not provided, the average current value (Ichg) supplied to the capacitor C1 can be controlled. Thus, the form of the charge control device 10 shown in the embodiment 5 can be applied also to a switching regulator of a voltage mode type, a hysteresis type, and a COT (Constant on Time) type other than the switching regulator of the current mode type.

Embodiment 6

Block Configuration

Figure 11:
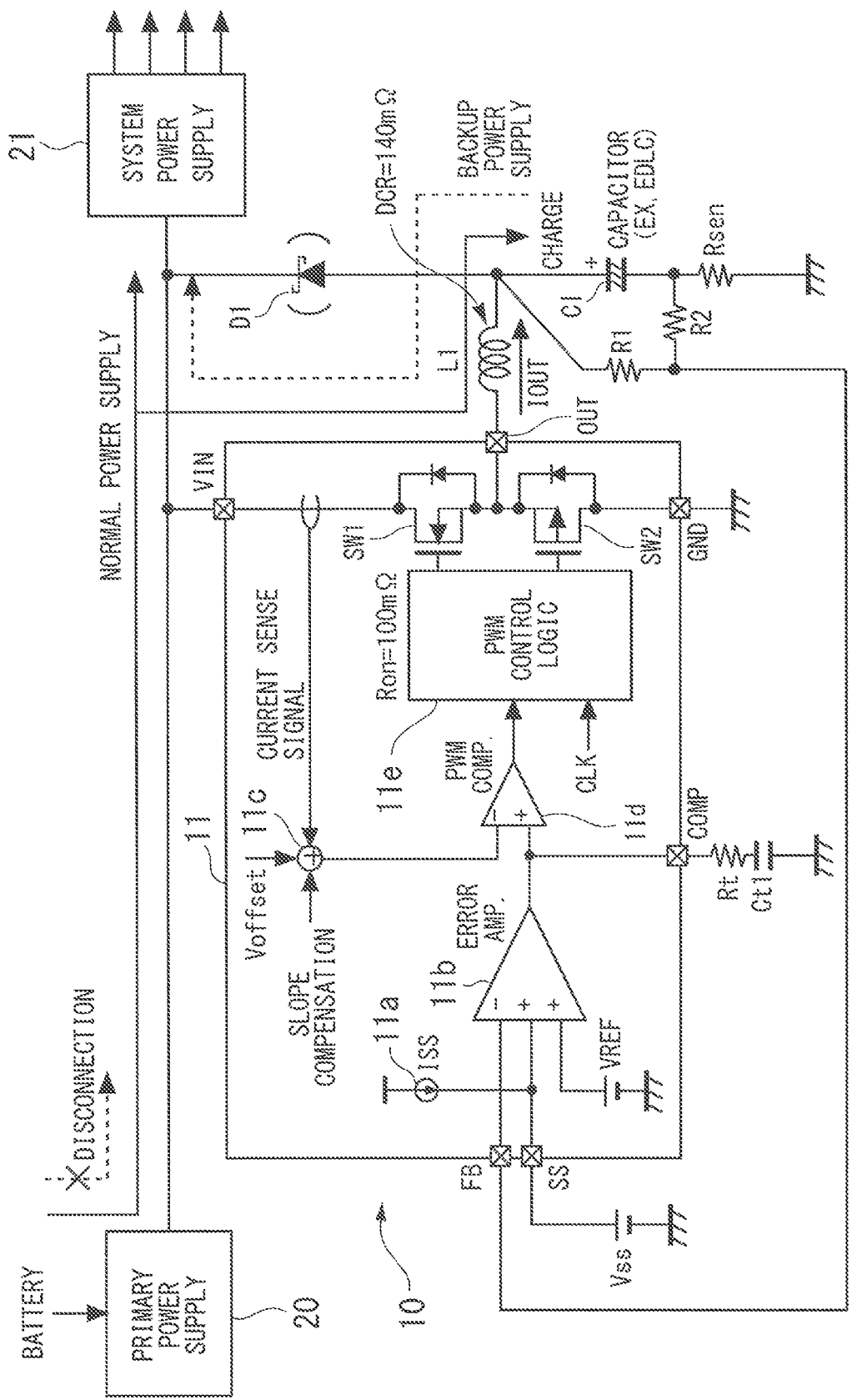
FIG. 11 is a diagram showing an example of a block configuration of a charge control device in an embodiment 6.

FIG. 11 is a view showing an example of a block configuration of the charge control device 10 according to an embodiment 6 (hereinafter referred to also as "the embodiment"). The charge control device 10 shown in FIG. 10 is a form in which the charge voltage (Vout) charged in the capacitor C1 is further reflected as a feedback amount with respect to the form of the charge control device 10 described in the embodiment 5.

In the charge control device 10 in the embodiment, as described in the embodiment 3, for example, the current value (Iin) flowing into the switching regulator 11 during the switching operation is controlled in accordance with the charged state of the capacitor C1 by reflecting the charge voltage (Vout) charged in the capacitor C1 as the feedback amount.

In the charge control device 10 in the embodiment, even in the case other than the current-mode-type switching regulator, when the current capacity of the primary power supply 20 or the current amount capable of supply of the battery is limited, the capacitor C1 can be charged while the maximum value of the current value (Iin) flowing into the switching regulator 11 is suppressed.

The charge control device 10 shown in FIG. 11 includes at least the switching regulator 11, the inductor element L1, a unit that applies the bias voltage Vss (hereinafter also referred to simply as the "bias voltage Vss"), the resistance Rsen, and the resistances R1 and R2. The resistances R1 and R2 detect the charge voltage charged in the capacitor C1. In the block configuration shown in FIG. 11, the constitution other than the resistances R1 and R2 is similar to the constitution in FIG. 9.

The one end of the resistance R1 is connected to the positive electrode-side terminal of the capacitor C1, while the other end is connected to the FB terminal. The one end of the resistance R2 is connected to the negative electrode-side terminal of the capacitor C1, while the other end is connected to the FB terminal. Hereinafter, the charge control operation of the charge control device 10 of the embodiment will be described mainly on the constitution different from that of FIG. 9.

(Charge Control Operation)

In the switching regulator 11 in FIG. 11, the charge voltage (Vout) of the capacitor C1 detected through the resistance (R1, R2) and the potential difference between the negative electrode-side terminal of the capacitor C1 and the GND detected through the resistance Rsen is input as the feedback voltage into the inverted input terminal of the error amplifier 11b.

The voltage value of the bias voltage Vss connected to the SS terminal outside the switching regulator 11 is set to a voltage value less than the reference voltage VREF. The bias voltage Vss applied to the SS terminal is input into the non-inverted input terminal of the error amplifier 11b.

The error amplifier 11b amplifies the differential voltage (error) between the feedback voltage input onto the FB terminal and the bias voltage Vss by the predetermined gain (A) and outputs the amplified differential voltage as an error signal to the output terminal.

The relationship of the embodiment among the current average value (Ichg) of the current (Iout) supplied to the capacitor C1 through the inductor element L1, the charge voltage (Vout) of the capacitor C1, the bias voltage Vss, the resistance Rsen, the resistance (R1, R2) is expressed by the following formula (9):

$$Ichg = \frac{Vss - \frac{R2}{R1} \times (Vout - Vss)}{Rsen} \quad \text{Formula (9)}$$

※ Ichg = Average value obtained by eliminating the ripple of IOUT

As shown in the formula (9), the charge control device 10 according to the embodiment can control the current average value (Ichg) supplied to the capacitor C1 through the inductor element L1 during the switching operation to a constant current value according to the bias voltage Vss, the resistance Rsen, and the charge voltage (Vout) of the capacitor C1 detected through the resistances R1 and R2.

(Charge Current Characteristics)

Figure 12:
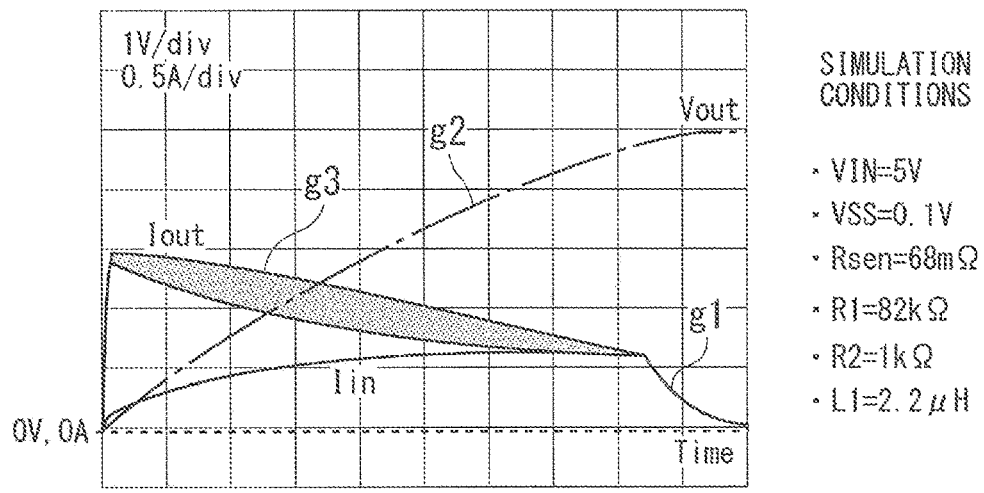
FIG. 12 is a diagram showing an example of charge current characteristics of the embodiment 6.

FIG. 12 is a diagram showing an example of the charge current characteristics by the charge control device 10 of the embodiment. The charge current characteristics in FIG. 12 are a result of simulation analysis of the charge control device 10 shown in FIG. 11 assuming that the input voltage of the VIN terminal is "5 V", the bias voltage Vss is "0.1 V", the resistance Rsen is "68 mΩ", the resistance R1 is "82 kΩ", the resistance R2 is "1 kΩ", and the inductor element L1 is "2.2 µH".

In FIG. 12, a graph g1 shows a temporal change of the average value (Iin) of the current ISW flowing between the VIN terminal and the source of the switching element SW1 during the switching operations of the switching elements SW1 and SW2. A graph g2 shows a temporal change of the charge voltage value (Vout) of the capacitor C1, and a graph g3 shows a temporal change of the current value (Iout) supplied to the capacitor C1 through the inductor element L1. A vertical axis in FIG. 12 indicates a current value (0.5 A/div) and a voltage value (1 V/div), while a lateral axis indicates normalized time elapse, and a broken line in parallel with the lateral axis indicates the 0 V standard and the 0 A standard.

As shown in the graph g1, the current value (Iin) flowing into the switching regulator 11 during the switching operation gently rises/changes with the time elapse from the start of the switching operation and reaches the maximum value of approximately 0.7 A. The current value (Iin) after having reached the maximum value changes in the constant state within the range from 0.7 A to 0.5 A or slightly decreases with the time elapse.

As shown in the graph g2, the charge voltage value (Vout) of the capacitor C1 changes to gently rise with the time elapse from the start of the switching operation and reaches the constant voltage value determined by the charge capacity of the capacitor C1. It is known from relative temporal changes in the graph g1 and the graph g2 that the current value (Iin) reaches the maximum value when the charged state of the capacitor C1 is in the vicinity of approximately a half of the full-charged capacity. Moreover, by comparing the temporal change tendency of the graph g1 shown in FIG. 10 with the temporal change tendency of the graph g1 shown in FIG. 12, it is known that relative intensity of the current value (Iin) flowing into the switching regulator 11 during the switching operation is suppressed.

As shown in the graph g3, the temporal change of the current value (Iout) supplied to the capacitor C1 lowers with constant inclination with the time elapse from the start of the switching operation and changes to reach the current value (Iin) flowing into the switching regulator 11 during the switching operation. It is known from the relative temporal changes in the graph g3 and the graph g2 that the current value (Iin) flowing into the switching regulator 11 decreases with the increase of the charge voltage value (Vout) of the capacitor C1.

Figure 13:
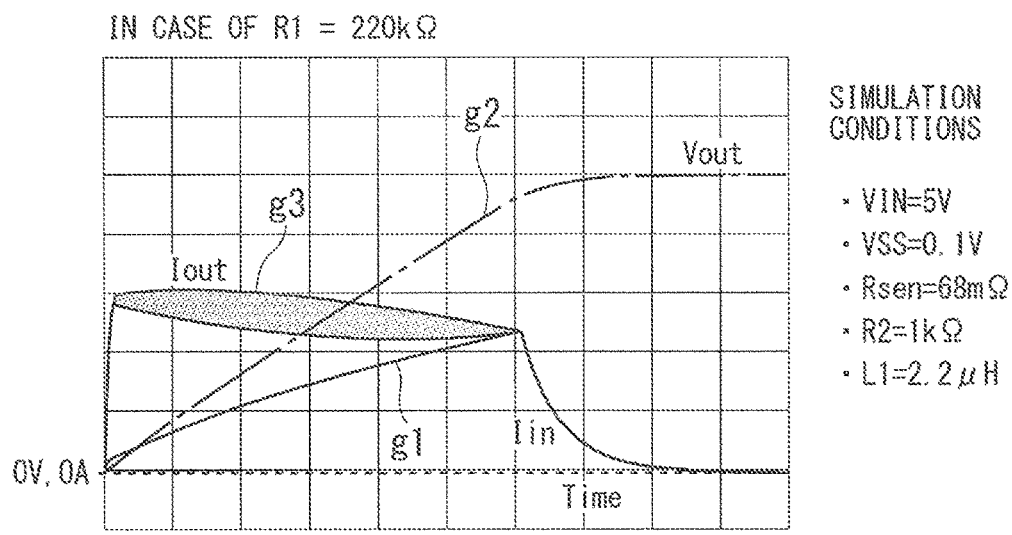
FIG. 13 is a diagram showing an example of charge current characteristics of the embodiment 6.

FIG. 13 is a diagram of another example of the charge current characteristics by the charge control device 10 of the embodiment. FIG. 13 is a result of simulation analysis of the charge control device 10 shown in FIG. 11 with the resistance R1 at "220 kΩ" and the other conditions similar to those in FIG. 12 in order to check a degree of contribution of the resistance R1 to the charge current characteristics. The graphs g1, g2, and g3, the vertical axis, the lateral axis, the 0 V standard, and the 0 A standard shown in FIG. 13 are similar to those in FIG. 12.

As shown in the graph g1, the current value (Iin) flowing into the switching regulator 11 during the switching operation rises/changes with the time elapse from the start of the switching operation and reaches the maximum value of approximately 1.1 A. As shown in the graph g3, the temporal change of the current value (Iout) supplied to the capacitor C1 lowers with constant inclination with the time elapse from the start of the switching operation and changes to reach the current value (Iin) flowing into the switching regulator 11 during the switching operation.

It is known from comparison of the temporal change tendencies between the graphs g1 and g2 shown in FIG. 12 and the graphs g1 and g2 shown in FIG. 13 that a rise change of the current value (Iin) from the start of the switching operation gets closer to the linear constant inclination with an increase in the resistance value of the resistance R1. It is known that the maximum value the current value (Iin) reaches increases with the increase of the resistance value of the resistance R1. Moreover, with the increase of the resistance value of the resistance R1, the constant inclination of the temporal change of the current value (Iout) supplied to the capacitor C1 decreases.

[Variation] (Block Configuration)

Figure 14:
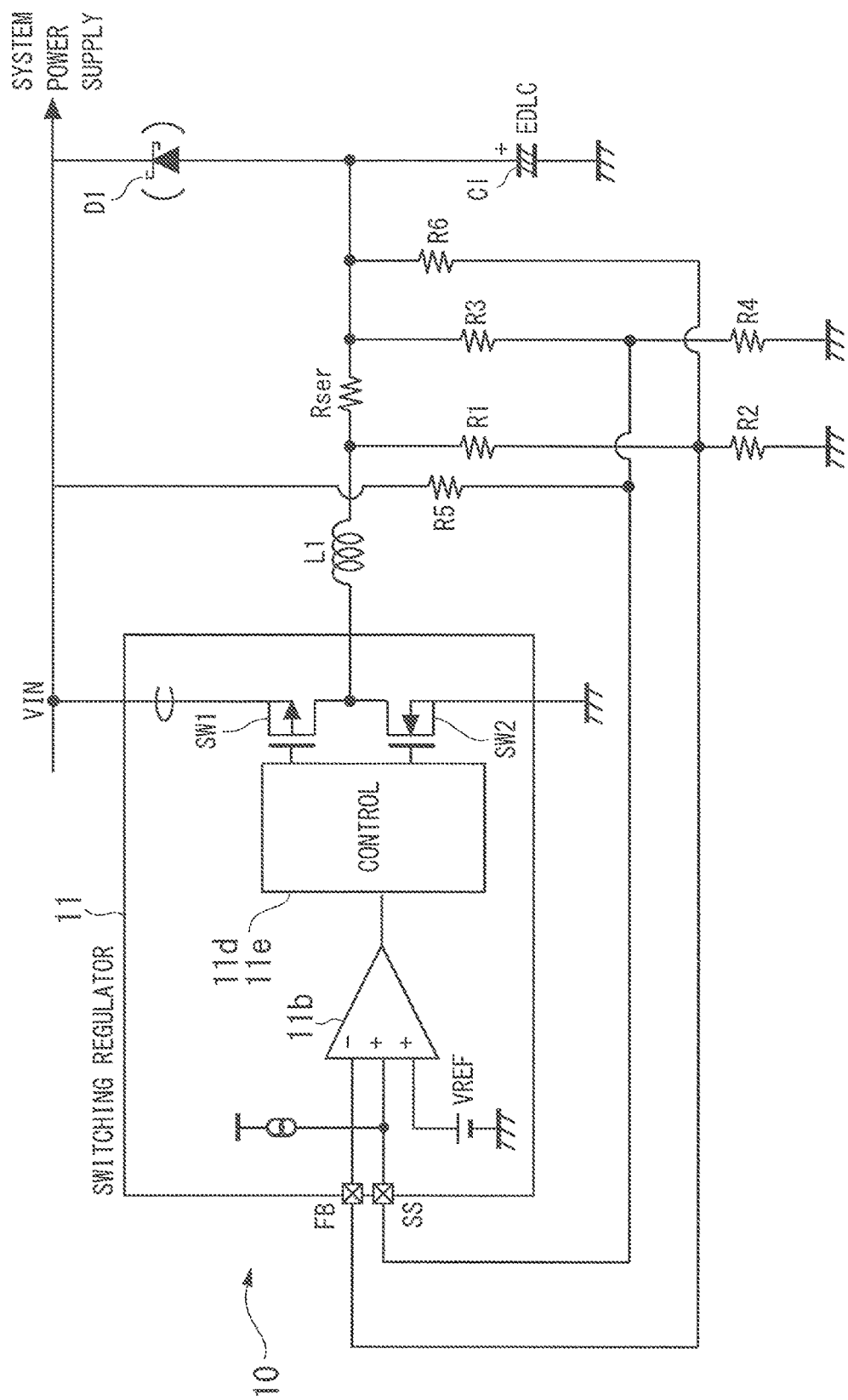
FIG. 14 is a diagram showing an example of a block configuration of a charge control device in a variation.

FIG. 14 is a diagram showing an example of a block configuration of the charge control device 10 according to a variation. It was described in the form shown in the embodiment 5 and the form shows in the embodiment 6, in the charge control device 10, the charge current supplied to the capacitor C1 constituting the power supply for backup can be controlled on the basis of the bias voltage Vss and the feedback voltage. In the charge control device 10 of the variation, the resistance Rsen is provided between the inductor element L1 and the positive electrode terminal of the capacitor C1, and the constant current control is executed by using a potential difference generated in the resistance Rsen.

The charge control device 10 of the variation includes at least the switching regulator 11, the inductor element L1, the resistance Rsen, the resistances R1, R2, R3, R4, R5, and R6. In the block configuration shown in FIG. 14, the constitution other than the resistance Rsen and the resistances (R1 to R6) is similar to the constitution in FIG. 9. The switching regulator 11 in FIG. 14 is simplified.

(Charge Control Operation)

In FIG. 14, one end of the resistance Rsen is connected to the output end of the inductor element L1, while the other end is a connected to the positive electrode-side terminal of the capacitor C1. One end of the resistance R1 and the output end of the inductor element L1 are connected, while the other end of the resistance R1 and the FB terminal of the switching regulator 11 are connected. Moreover, the other end of the resistance R2 with one end grounded to the GND of the vehicle and the FB terminal of the switching regulator 11 are connected. The other end of the resistance R6 with one end connected to the positive electrode-side terminal of the capacitor C1 and the FB terminal of the switching regulator 11 are connected.

The voltage of the resistance Rsen provided between the inductor element L1 and the positive electrode terminal of the capacitor C1 on the output end side of the inductor element L1 is input as the feedback voltage to the FB terminal of the switching regulator 11 through the resistances R1 and R2. The charge voltage (Vout) charged in the capacitor C1 is reflected in the feedback amount by the resistance R6.

Moreover, in FIG. 14, the one end of the resistance R3 is connected to the positive electrode-side terminal of the capacitor C1, while the other end of the resistance R3 is connected to the SS terminal of the switching regulator 11. The other end of the resistance R4 with one end grounded to the GND of the vehicle is connected to the SS terminal of the switching regulator 11. The other end of the resistance R5 with one end connected to the voltage (VIN) supplied by the primary power supply 20, not shown, is connected to the SS terminal of the switching regulator 11.

The voltage of the resistance Rsen provided between the inductor element L1 and the positive electrode terminal of the capacitor C1 on the positive electrode terminal side of the capacitor C1 is input as the bias voltage Vss into the S3 terminal of the switching regulator 11 through the resistances R3 and R4. An offset voltage for offsetting the bias voltage Vss is supplied by the resistance R5.

In the charge control device 10 of the variation, the potential difference detected through the resistance Rsen provided between the inductor element L1 and the positive electrode terminal of the capacitor C1 is applied by the resistances (R1 to R4) between the SS terminal and the FB terminal of the switching regulator 11. Moreover, in the charge control device 10 of the variation, the bias voltage Vss is offset by the resistance R5. The charge voltage (Vout) charged in the capacitor C1 is reflected by the resistance R6 in the feedback amount. Hereinafter, the charge control operation of the charge control device 10 of the variation will be described mainly on the constitution different from that in FIG. 9.

(Charge Control Operation)

In the form of the variation, the feedback voltage is input into the inverted input terminal of the error amplifier 11b of the switching regulator 11. Moreover, the offset bias voltage Vss is input into the non-inverted input terminal of the error amplifier 11b. The voltage value of the offset bias voltage Vss is set through the resistances R3, R4, and R5 so as to be less than the reference voltage VREF.

The error amplifier 11b amplifies the differential voltage (error) between the feedback voltage input into the inverted input terminal and the offset bias voltage Vss by the predetermined gain (A) and outputs the amplified differential voltage as the error signal to the output terminal.

In FIG. 14, the resistance values of the resistance R1 and the resistance R3 are set to the same value, and the resistance values of the resistance R2 and the resistance R4 are set to the same value. In the form of the variation, the switching regulator 11 performs the control operation under the setting conditions such that a voltage of R1/R2 times of the offset voltage value is generated in the resistance Rsen provided between the inductor element L1 and the positive electrode terminal of the capacitor C1. As a result, in the charge control device 10 of the variation, too, the constant current control is made possible similarly to the form shown in the embodiment 5.

Moreover, by reflecting the charge voltage (Vout) charged in the capacitor C1 in the feedback amount by the resistance R6, the current value (Iin) flowing into the switching regulator 11 during the switching operation can be controlled in accordance with the charged state of the capacitor C1. In the charge control device 10 of the variation, too, the capacitor C1 can be charged while the maximum value of the current value (Iin) flowing into the switching regulator 11 is suppressed similarly to the form shown in the embodiment 6.

(Charge Current Characteristics)

Figure 15:
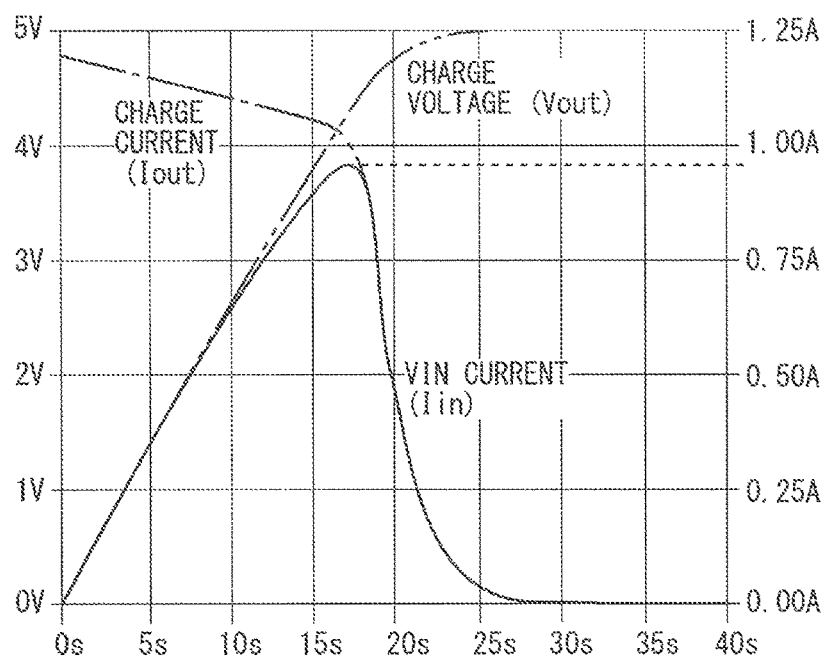
FIG. 15 is a diagram for explaining the charge current characteristics of the variation.
Figure 16:
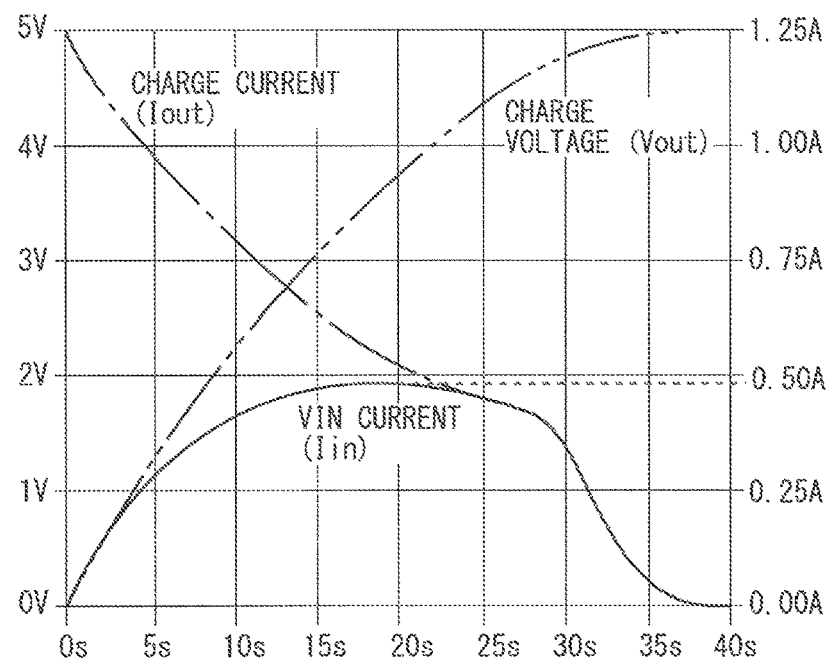
FIG. 16 is a diagram for explaining the charge current characteristics of the variation.

FIGS. 15 and 16 are diagrams for explaining the charge current characteristics of the variation. FIG. 15 is charge current characteristics of the variation in the form not including the resistance R6, and FIG. 16 is charge current characteristics of the variation in the form including the resistance R6. In FIGS. 15 and 16, the graph indicated by a solid line expresses the temporal change of the average value (Iin) of the current ISW flowing between the VIN terminal and the source of the switching element SW1 during the switching operations of the switching elements SW1 and SW2. A graph indicated by a two-dot chain line expresses the temporal change of the charge voltage value (Vout) of the capacitor C1. A graph indicated by a one-dot chain line expresses the temporal change of the current value (Iout) supplied to the capacitor C1 through the inductor element L1. A vertical axis in each of FIGS. 15 and 16 indicates a current value (0.25 A/div) and a voltage value (1 V/div), while a lateral axis indicates time elapse (unit time: 5 sec).

As shown in the graph of the one-dot chain line in FIG. 15, the current value (Iout) supplied to the capacitor C1 through the inductor element L1 shows a change tendency of decreasing with the increase of the charge voltage value (Vout) of the capacitor C1 indicated by the graph of the two-dot chain line. Moreover, as shown in the graph by the solid line, she current value (Iin) flowing into the switching regulator 11 during the switching operation shows a change tendency of rising/changing with the time elapse from the start of the switching operation and reaching the maximum value in the vicinity of 0.9 A.

Moreover, in the form including the resistance R6, as shown in the graph of the solid line in FIG. 16, the current value (Iin) flowing into the switching regulator 11 during the switching operation shows a change tendency of rising/changing with the time elapse from the start of the switching operation and reaching the maximum value. Moreover, the current value (Iin) after having reached the maximum value shows a tendency of a constant state in the vicinity of the maximum value or of decreasing/changing with the time elapse. In the form including the resistance R6, the maximum value of the current value (Iin) flowing into the switching regulator 11 during the switching operation shows a tendency of being suppressed to less than 0.5 A.

The invention claimed is:

1. A charge control device comprising a switching regulator configured to charge a capacitor with electricity supplied from a power supply, the switching regulator including:
   an error amplifier configured to output an error signal based on a differential voltage between a feedback-input control amount and a reference voltage; and
   a control unit configured to control a charge current supplied to the capacitor based on the error signal,
   the charge control device being configured to feedback-input the error signal output by the error amplifier, into the error amplifier as the control amount.

2. The charge control device according to claim 1, wherein
   the charge control device has a first voltage dividing resistance connected between an output terminal of the error amplifier and a ground, and is configured to feedback-input a voltage obtained by dividing the error signal by the first voltage dividing resistance, into the error amplifier as the control amount.

3. The charge control device according to claim 2, wherein the charge control device is configured to feedback-input a charge voltage charged in the capacitor, into the error amplifier through the first voltage dividing resistance.

4. The charge control device according to claim 1, wherein the charge control device has a second voltage dividing resistance connected between an output terminal of the error amplifier and an output line of the power supply, and is configured to feedback-input a voltage obtained by dividing the error signal by the second voltage dividing resistance, into the error amplifier as the control amount.

5. The charge control device according to claim 4, wherein the charge control device is configured to feedback-input a charge voltage charged in the capacitor, into the error amplifier through the second voltage dividing resistance.

* * * * *